(12) United States Patent
Kitaizumi et al.

(10) Patent No.: US 8,878,108 B2
(45) Date of Patent: Nov. 4, 2014

(54) INDUCTION HEATING COOKER AND KITCHEN UNIT HAVING THE SAME

(75) Inventors: Takeshi Kitaizumi, Kyoto (JP); Naoaki Ishimaru, Shiga (JP); Yoichi Kurose, Kyoto (JP); Masafumi Sadahira, Shiga (JP); Yuichi Shimizu, Shiga (JP); Masayo Haji, Kyoto (JP)

(73) Assignee: Panasonic Corporation, Osaka (JP)

( * ) Notice: Subject to any disclaimer, the term of this patent is extended or adjusted under 35 U.S.C. 154(b) by 725 days.

(21) Appl. No.: 13/002,114

(22) PCT Filed: Mar. 5, 2010

(86) PCT No.: PCT/JP2010/001543
§ 371 (c)(1),
(2), (4) Date: Dec. 30, 2010

(87) PCT Pub. No.: WO2010/103766
PCT Pub. Date: Sep. 16, 2010

(65) Prior Publication Data
US 2011/0100980 A1    May 5, 2011

(30) Foreign Application Priority Data

Mar. 13, 2009 (JP) ................... 2009-060520
Aug. 3, 2009 (JP) ................... 2009-180499

(51) Int. Cl.
| H05B 6/12 | (2006.01) |
| H05B 6/22 | (2006.01) |
| H05B 6/04 | (2006.01) |
| H05B 6/08 | (2006.01) |
| H05B 3/68 | (2006.01) |
| F24C 15/10 | (2006.01) |

(52) U.S. Cl.
CPC ............ H05B 6/1254 (2013.01); H05B 6/1245 (2013.01); Y02B 40/126 (2013.01); H05B 2206/022 (2013.01)
USPC ........... 219/624; 219/620; 219/621; 219/622; 219/647; 219/660; 219/667; 219/446.1; 219/448.11; 126/220; 126/221

(58) Field of Classification Search
USPC ................ 219/601, 622, 624–627, 661, 663, 219/665–667, 672, 647, 649, 650; 126/220–221
See application file for complete search history.

(56) References Cited

U.S. PATENT DOCUMENTS 2,627,010 A * 1/1953 Matteson, Jr. et al. ........ 219/616
3,130,737 A * 4/1964 Jellies ......................... 134/57 D (Continued)

FOREIGN PATENT DOCUMENTS

| JP | 63299073 A | * 12/1988 | ............... H05B 6/12 |
| JP | 623299073 | * 12/1988 | ............... H05B 6/12 |

(Continued)

OTHER PUBLICATIONS

International Search Report issued Jun. 8, 2010 in International (PCT) Application No. PCT/JP2010/001543.

(Continued)

Primary Examiner — Dana Ross
Assistant Examiner — Gyounghyun Bae
(74) Attorney, Agent, or Firm — Wenderoth, Lind & Ponack, L.L.P.

(57) ABSTRACT

An induction heating cooker in which a size of heating coils can be freely set without being restricted by a size of an opening of a cabinet of a kitchen unit. The induction heating cooker has an outer casing including a flange extending in an outward direction from a top portion of a container receptacle, with a heating coil container space being provided between the flange and a plate, such that one portion of each of the heating coils is disposed in the heating coil container space.

13 Claims, 18 Drawing Sheets

(56) References Cited

U.S. PATENT DOCUMENTS

| | | | |
|---|---|---|---|
| 3,740,513 A * | 6/1973 | Peters et al. | 219/622 |
| 3,781,506 A * | 12/1973 | Ketchum et al. | 219/627 |
| 3,814,888 A * | 6/1974 | Bowers et al. | 219/624 |
| 3,962,962 A * | 6/1976 | Anderson | 99/474 |
| 4,348,571 A * | 9/1982 | Dills | 219/622 |
| 4,415,788 A * | 11/1983 | Field | 219/623 |
| 4,749,836 A * | 6/1988 | Matsuo et al. | 219/626 |
| 4,899,027 A * | 2/1990 | Wong | 219/623 |
| 4,910,372 A * | 3/1990 | Vukich | 219/622 |
| 5,808,280 A * | 9/1998 | Gaspard | 219/624 |
| 5,954,984 A * | 9/1999 | Ablah et al. | 219/621 |
| 5,979,429 A * | 11/1999 | Schultheis et al. | 126/39 G |
| 6,316,753 B2 * | 11/2001 | Clothier et al. | 219/621 |
| 7,009,159 B2 * | 3/2006 | Kataoka et al. | 219/622 |
| 7,049,563 B2 * | 5/2006 | Keishima et al. | 219/620 |
| 7,390,994 B2 * | 6/2008 | Oh et al. | 219/601 |
| 7,750,273 B2 * | 7/2010 | Herving | 219/622 |
| 8,129,664 B2 * | 3/2012 | Keishima et al. | 219/622 |
| 8,203,106 B2 * | 6/2012 | Kataoka et al. | 219/620 |
| 8,602,248 B2 * | 12/2013 | Mathieu | 220/573.1 |
| 2004/0245244 A1 * | 12/2004 | Hirota et al. | 219/624 |
| 2008/0185376 A1 * | 8/2008 | Gagas et al. | 219/623 |
| 2008/0223852 A1 * | 9/2008 | Bassill et al. | 219/647 |
| 2009/0314771 A1 * | 12/2009 | Okada et al. | 219/647 |

FOREIGN PATENT DOCUMENTS

| | | |
|---|---|---|
| JP | 2001-196153 | 7/2001 |
| JP | 2003-109734 | 4/2003 |
| JP | 2005-38739 | 2/2005 |
| JP | 2005-61678 | 3/2005 |
| JP | 2005-63740 | 3/2005 |
| JP | 2005-83639 | 3/2005 |

OTHER PUBLICATIONS

International Preliminary Report issued Oct. 27, 2011 in International (PCT) Application No. PCT/JP2010/001543, together with English translation thereof.

* cited by examiner

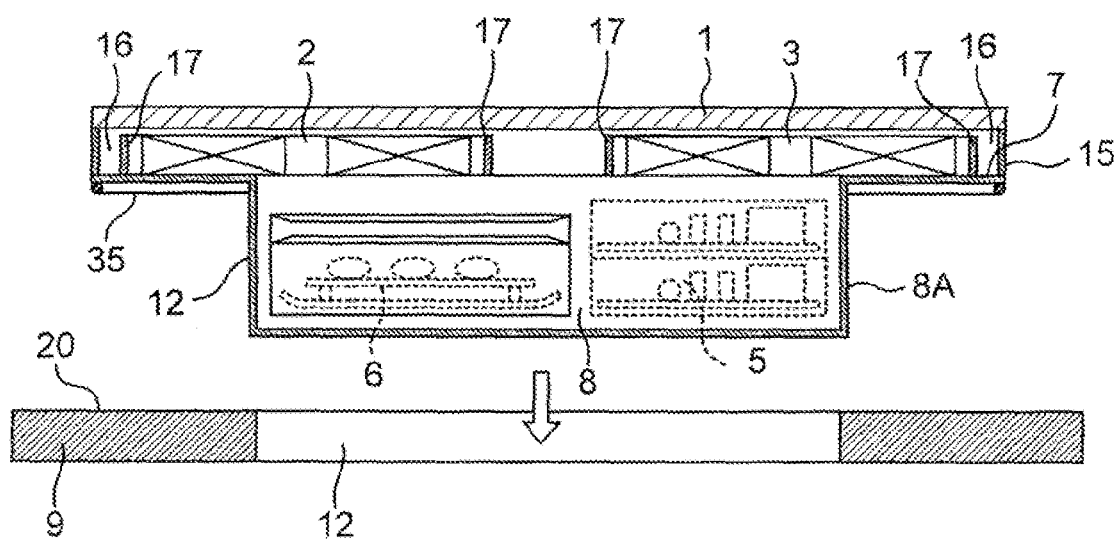

INDUCTION HEATING COOKER AND KITCHEN UNIT HAVING THE SAME

The entire disclosure of Japanese Patent Application Nos. 2009-060520 and 2009-180499 filed on Mar. 13, 2009 and Aug. 3, 2009, respectively, including specification, claims, drawings, and summary are incorporated herein by reference in its entirety.

TECHNICAL FIELD

The present invention relates to an induction heating cooker used as being installed in a cabinet of a kitchen unit and a kitchen unit provided with the cooker.

BACKGROUND ART

An exemplary conventional induction heating cooker will be described with reference to the drawings (for example, see Japanese Unexamined Patent Publication No. 2001-196153). FIG. 17A is a plan view showing a state where a conventional induction heating cooker is installed in a cabinet of a kitchen unit, and FIG. 17B is a cross-sectional view taken along line A-A in FIG. 17A. FIG. 18 is a perspective view showing the schematic structure of the conventional induction heating cooker.

As shown in FIG. 17A, the conventional induction heating cooker includes a flat plate 201 structured with a nonmetallic member such as heat resistant glass, and a container portion 208 disposed below the plate 201.

Disposed in the container portion 208 are heating coils 221, 222, and 223 that inductively heat a heating-target object, such as a cooking vessel, placed on the plate 201. It is noted that some conventional induction heating cookers have any of the heating coils 221, 222, and 223 replaced by electric heaters, e.g., radiant heaters, which resistively heat the heating-target object. The heating coils 221, 222, and 223 are disposed, for example, to leave about 5 mm of space to the back surface of the plate 201. Viewing the bottom side of FIG. 17A as the front side (near side) and the top side of FIG. 17A as the rear side (far side), the heating coil 221 is disposed on the front left side, the heating coil 222 being disposed on the front right side, and the heating coil 223 being disposed at the rear center.

In the container portion 208, a roaster 206 for grilling a food such as a fish is disposed below the front-left side heating coil 221. In the roaster 206, an electrical resistance heater, a grid, a drip pan, and the like are disposed. In the container portion 208, an inverter device 205 that supplies high frequency electric power to each of the heating coils 221 and 222 is disposed on the right side of the roaster 206. In the inverter device 205, an inverter circuit board that corresponds to the heating coil 221 and an inverter circuit board corresponding to the heating coil 222 are disposed in parallel one above the other.

As shown in FIG. 17A, the induction heating cooker structured as above is installed in a kitchen unit by having its container portion 208 inserted into an opening 212 provided at a top board 220 of a cabinet 209 of the kitchen unit, with the outer circumferential portion of its plate 201 being placed on a top board 220.

It is noted herein that the opening 212 of the kitchen unit is previously provided at the top board 220 in order to facilitate installation of various heating cooker devices, such as induction heating cookers, gas stove devices, and the like, in the cabinet 209. The manufacturers of the kitchen units employ a substantially unified size of the opening 212. For example, Japanese manufacturers of the kitchen units set the lateral width of the opening 212 to about 560 mm. Consequently, the outer casings of various heating cooker devices also have their external dimensions substantially unified. This eliminates the need for caring about discrepancy in various dimensions between the kitchen units and the heating cooker devices when newly purchasing the heating cooker devices as replacements, which are shorter in product lifetime than the kitchen units, thereby enhancing flexibility in choosing the heating cooker devices.

However, with the conventional induction heating cookers, the size of the container portion 208 is determined by the size of the opening 212 of the kitchen unit. Therefore, the size, layout, and the like of the heating coils 221, 222, and 223 disposed in the container portion 208 are restricted. That is, with the conventional induction heating cookers, it is difficult to increase the diameter of each of the heating coils 221, 222, and 223. For example, when the container portion 208 is designed to have the same lateral width as that of the opening 212, the diameter of each of the heating coils 221 and 222 disposed in the container portion 208 will be at a maximum of 280 mm (=560 mm/2). In this case, with a cooking vessel whose bottom diameter is more than 280 mm, it is difficult to heat the cooking vessel with an excellent heat distribution, i.e., to uniformly heat the entire bottom of the cooking vessel.

Further, as to cooking vessels such as frying pans, their diameter measured at any midway portions of the height other than at the bottom is usually greater than the diameter at the bottom. For example, when the diameter at the bottom is 260 mm, the diameter measured at the midway portions of the height is generally 300 mm or more. Accordingly, for example, when placing one cooking vessel on the heating coil 221 and the other cooking vessel on the heating coil 222 in order to heat the two cooking vessels simultaneously, care must be taken to avoid contact between respective sides of the cooking vessels. Additionally, since the cooking vessels are each usually provided with a handle, care must also be taken to avoid contact between the handle of one of the cooking vessels and the other cooking vessel. Therefore, when two cooking vessels each having a great bottom diameter are heated simultaneously, it becomes difficult to align the center of each heating coil and the center of each cooking vessel, and hence it becomes difficult to uniformly heat the entire bottom of each cooking vessel. Accordingly, the conventional induction heating cookers have need, e.g., to separately heat two cooking vessels of great bottom diameters, thereby posing an issue of insufficient cooking work efficiency.

Still further, in the conventional induction heating cookers, in order to dispose a plurality of heating coils each of whose diameter is as maximized as possible under the condition that the size of the container portion 208 is determined, the heating coils 221 and 222 and the heating coil 223 are disposed as being displaced on the front side and on the rear side, respectively. In this case, there arises an issue that the rear heating coil 223 is awkward to use, particularly when cooking vessels are heated by the front heating coils 221 and 222.

Still further, as shown in FIG. 19, when a ring-shaped magnetic field shielding member 217 is disposed around the outer circumference of each of the heating coils 221, 222, and 223 so as to suppress magnetic field leakage from the heating coils, there arises an issue that the size of each of the heating coils must further be reduced.

Accordingly, an object of the present invention is to solve the issues described above, and to provide an induction heating cooker and a kitchen unit provided with the cooker, with which the size of heating coils can freely be set without being restricted by the size of an opening of a cabinet of a kitchen unit.

BRIEF DESCRIPTION OF THE INVENTION

In order to achieve the object described above, the present invention is structured as follows.

According to a first aspect of the present invention, there is provided an induction heating cooker, comprising:

an outer casing for the induction heating cooker;

a plate for covering a top portion of the outer casing;

a heating coil for inductively heating a heating-target object placed on the plate; and an inverter device for supplying the heating coil with a high frequency current, wherein the outer casing has:

a container receptacle that forms a container portion containing the inverter device, and that is inserted into an opening formed at a top board of a cabinet of a kitchen unit; and a flange that is formed to extend in an outward direction from a top portion of the container receptacle, and that is placed on the top board surrounding the opening, and wherein a heating coil container space for containing one portion of the heating coil is formed between the flange and the plate, and the one portion of the heating coil is disposed in the heating coil container space.

According to a second aspect of the present invention, there is provided the induction heating cooker as defined in first aspect, further comprising a metal plate being a non-magnetic material having heat conductivity between the flange and the one portion of the heating coil, wherein one portion of the metal plate has a surface exposed in the container portion.

According to a third aspect of the present invention, there is provided the induction heating cooker as defined in second aspect, wherein the induction heating cooker includes a plurality of heating coils, each of which is identical with the heating coil, disposed on a single piece of the metal plate.

According to a fourth aspect of the present invention, there is provided the induction heating cooker as defined in first aspect, wherein the heating coil has a winding for generating a high frequency magnetic field induced by the high frequency current, and both end portions of the winding are disposed in the container portion.

According to a fifth aspect of the present invention, there is provided the induction heating cooker as defined in first aspect, further comprising:

a temperature detection device that detects a temperature of the heating-target object, wherein the temperature detection device is disposed at a center portion of the heating coil and in the container portion.

According to a sixth aspect of the present invention, there is provided the induction heating cooker as defined in first aspect, wherein the heating coil has:

a winding for generating a high frequency magnetic field induced by the high frequency current;

a support plate for supporting the winding; and a magnetic field shielding magnetic material disposed below the winding, for collecting the high frequency magnetic field generated by the winding, wherein the support plate has a concave portion for containing the magnetic field shielding magnetic material, containment of the magnetic field shielding magnetic material in the concave portion makes a total height dimension for the support plate and the magnetic field shielding magnetic material smaller than a total thickness for the support plate and the magnetic field shielding magnetic material.

According to a seventh aspect of the present invention, there is provided the induction heating cooker as defined in first aspect, wherein the heating coil has:

a winding for generating a high frequency magnetic field induced by the high frequency current; and a plurality of magnetic field shielding magnetic materials disposed below the winding, for collecting the high frequency magnetic field generated by the winding, wherein the plurality of magnetic field shielding magnetic materials are disposed such that at least one of the plurality of magnetic field shielding magnetic materials exists in each of the heating coil container space and the container portion, and the magnetic field shielding magnetic material disposed in the heating coil container space is smaller in thickness than the magnetic field shielding magnetic material disposed in the container portion.

According to an eighth aspect of the present invention, there is provided the induction heating cooker as defined in seventh aspect, wherein the magnetic field shielding magnetic material disposed in the heating coil container space and the magnetic field shielding magnetic material disposed in the container portion are substantially identical in volume to each other.

According to a ninth aspect of the present invention, there is provided the induction heating cooker as defined in seventh aspect, wherein the magnetic field shielding magnetic material disposed in the heating coil container space is greater in number than the magnetic field shielding magnetic material disposed in the container portion.

According to a tenth aspect of the present invention, there is provided the induction heating cooker as defined in seventh aspect, wherein the magnetic field shielding magnetic material disposed in the heating coil container space is longer in lateral width than the magnetic field shielding magnetic material disposed in the container portion.

According to an eleventh aspect of the present invention, there is provided the induction heating cooker as defined in seventh aspect, wherein the magnetic field shielding magnetic material disposed in the heating coil container space and the magnetic material disposed in the container portion are disposed such that their respective top surfaces are substantially level with each other.

According to a twelfth aspect of the present invention, there is provided the induction heating cooker as defined in seventh aspect, further comprising a metal plate being a non-magnetic material having heat conductivity between the flange and the one portion of the heating coil, wherein the magnetic field shielding magnetic material disposed in the heating coil container space is disposed on the metal plate.

According to a thirteenth aspect of the present invention, there is provided a kitchen unit comprising the induction heating cooker as defined in any one of the first aspect to 12th aspect.

With the induction heating cooker of the present invention, because the heating coil container space is formed between the flange placed on the top board and the plate, the heating coil can freely be disposed without being restricted by the size of the opening of the cabinet. Accordingly, the size of the heating coil can be increased, and a cooking vessel having a great bottom diameter can be heated with an excellent heat distribution. Further, in a case where two heating coils are provided, they can be disposed to be away from each other without changing their sizes. Therefore, even when two cooking vessels each having a great bottom diameter are simultaneously heated by the two heating coils, contact between the cooking vessels can be suppressed. Accordingly, the cooking work efficiency can be improved.

It is noted that, in the induction heating cooker of the present invention, the top surface of the plate becomes higher than the top board by the height of the heating coil container space. However, the heating coil container space can be reduced in thickness, since just the heating coil should be disposed in the heating coil container space. Accordingly, work efficiency in placing a cooking vessel on the plate, or cooking work efficiency in moving the cooking vessel on the plate for cooking will not be impaired. Further, being different from a burner such as a gas stove, the heating coil can be designed to have its own thickness reduced. Specifically, in order for the heating coil to obtain a prescribed inductance L required for inductively heating, the diameter, the number, the manner of winding, and the lay of the winding of the heating coil, the diameter (outer diameter) of the heating coil, and the like are set. For example, because the inductance L becomes greater in proportion to the area of the heating coil, use of a heating coil having a great diameter achieves a prescribed inductance L despite its reduced thickness. Accordingly, the height of the heating coil container space can be reduced.

BRIEF DESCRIPTION OF THE DRAWINGS

These and other aspects and features of the present invention will become clear from the following description taken in conjunction with the preferred embodiments thereof with reference to the accompanying drawings, in which:

FIG. 9 is a cross-sectional view showing a manner of installing an induction heating cooker according to a seventh embodiment of the present invention in a cabinet (kitchen counter);

DETAILED DESCRIPTION OF THE INVENTION

Figure 1A:
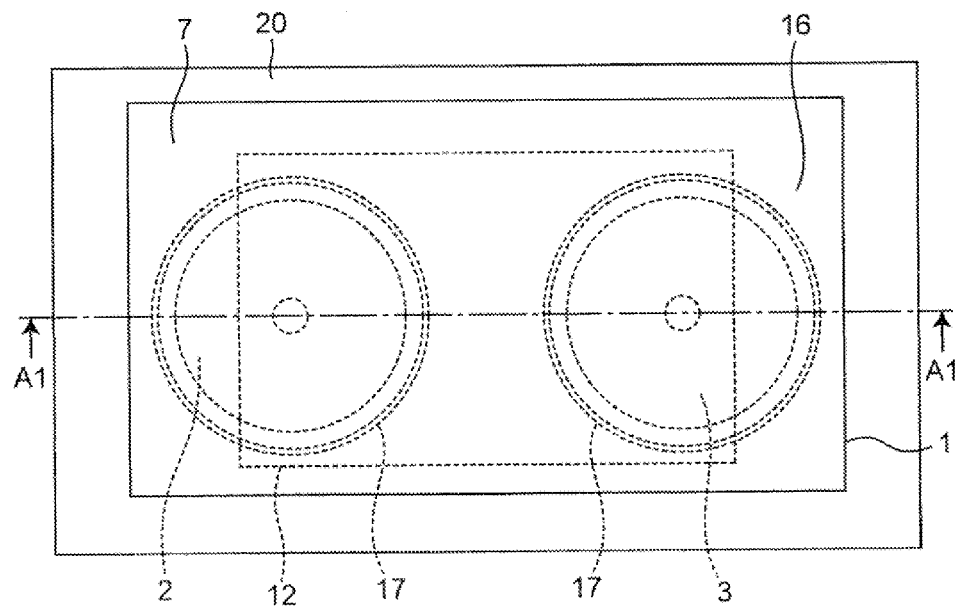
FIG. 1A is a plan view of a kitchen unit provided with an induction heating cooker according to a first embodiment of the present invention.

Before the description of the present invention proceeds, it is to be noted that like parts are designated by like reference numerals throughout the accompanying drawings.

In the following, embodiments of the present invention will be described with reference to the drawings. Note that the present invention is not limited by the embodiments.

First Embodiment

Figure 1B:
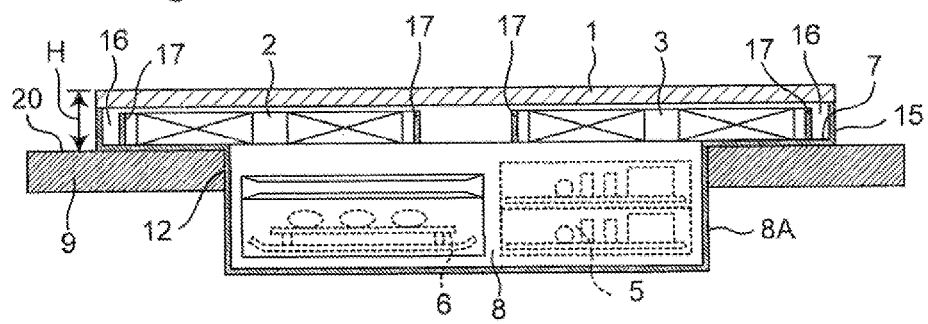
FIG. 1B is a cross-sectional view taken along line A1-A1 in FIG. 1A.

The structure of an induction heating cooker and a kitchen unit provided with the cooker according to a first embodiment of the present invention will be described with reference to FIGS. 1A and 1B. FIG. 1A is a plan view of the kitchen unit provided with the induction heating cooker according to the first embodiment of the present invention. FIG. 1B is a cross-sectional view taken along line A1-A1 in FIG. 1A.

As shown in FIG. 1B, the induction heating cooker according to the first embodiment includes an outer casing 15, and a flat plate 1 structured with a nonmetallic member such as heat resistant glass covering the top of the outer casing 15. The outer casing 15 has a box-like container receptacle 8A whose top is open, and a flange 7 provided to extend in the outward direction from the top of the container receptacle 8A (so as to extend circumferentially in the substantially horizontal direction). The container receptacle 8A is an element for forming (partitioning) a container portion 8 in which an inverter device 5, which will be described later, and the like are contained. Here, the container portion 8 corresponds to the space not only the interior space of the container receptacle 8A, but also the space additionally including a space between the interior space and the plate 1. The container receptacle 8A is formed to have a size with which it can be inserted into an opening 12 formed at a top board 20 of a cabinet (hereinafter referred to as a kitchen counter) 9 of the kitchen unit. When the container receptacle 8A is inserted into the opening 12 of the top board 20, the flange 7 is placed on the top board 20 surrounding the opening 12.

In the outer casing 15, a left side heating coil 2 and a right side heating coil 3 are disposed to leave about 5 mm of space to the back surface of the plate 1. The left side heating coil 2 and the right side heating coil 3 are heating coils for inductively heating a heating-target object, such as a cooking vessel, placed on the plate 1. The left side heating coil 2 and the right side heating coil 3 are disposed such that at least one portions of respective coils are positioned in a heating coil container space 16 formed between the flange 7 and the plate 1. Accordingly, the left side heating coil 2 and the right side heating coil 3 are positioned to be higher than the top board 20 of the kitchen counter 9. Further, one portions of the left side heating coil 2 and the right side heating coil 3, respectively, are positioned over the top board 20 of the kitchen counter 9, and the other portions of the left side heating coil 2 and the right side heating coil 3, respectively, are positioned over the opening 12.

In the container portion 8, below the left side heating coil 2, a roaster 6 for grilling a food such as a fish using an electric heater is arranged. In the container portion 8, below the right side heating coil 3, an inverter device 5 that supplies the left side heating coil 2 and the right side heating coil 3 with high frequency electric power is disposed.

Further, the outer casing 15 is formed with a ferrous metal plate, so as to integrally structure the container receptacle 8A and the flange 7. Thus, the outer casing 15 prevents the radiation noise generated by the heating coils 2 and 3 or the inverter device 5 from leaking externally to the outer casing 15, and functions as a rigid body that supports heavy loads such as the heating coils 2 and 3.

With the induction heating cooker according to the first embodiment, because the heating coil container space 16 is formed between the flange 7 placed on the top board 20 and the plate 1, the heating coils 2 and 3 can freely be disposed without being restricted by the size of the opening 12 of the kitchen unit. Accordingly, the size of the heating coils 2 and 3 can be increased, and a cooking vessel having a great bottom diameter can be heated with an excellent heat distribution. Further, the heating coils 2 and 3 can be disposed so as to be away from each other without changing the size of the heating coils 2 and 3. Therefore, even when two cooking vessels each having a great bottom diameter are simultaneously heated by the heating coils 2 and 3, contact between the cooking vessels can be suppressed. Accordingly, the cooking work efficiency can be improved.

It is noted that, although the left side heating coil 2 and the right side heating coil 3 have their respective one portions disposed in the heating coil container space 16 in the first embodiment, the present invention is not limited thereto. At least one portion of one of the left side heating coil 2 and the right side heating coil 3 being disposed in the heating coil container space 16 will suffice. Further, although the heating coil container space 16 is disposed on the flange 7 that is positioned on the right and left sides with respect to the opening 12 in the first embodiment, the present invention is not limited thereto. For example, the heating coil container space 16 may be disposed on the flange 7 that is positioned on the front and rear sides with respect to the opening 12.

Still further, although two heating coils, i.e., the left side heating coil 2 and the right side heating coil 3, are provided in the first embodiment, the present invention is not limited thereto. For example, one heating coil, or three or more heating coils may be provided. When three or more heating coils are provided, at least one portion of one of the heating coils being disposed in the heating coil container space 16 will suffice.

Still further, although the heating coils 2 and 3 are disposed to leave about 5 mm of space to the back surface of the plate 1 in the first embodiment, the present invention is not limited thereto. For example, if a heat insulating material is interposed between the back surface of the plate 1 and the heating coils 2 and 3, then a problem such as the heating coils 2 and 3 burnt by radiation heat from the heated cooking vessels will not arise. Therefore, the height of the space between the back surface of the plate 1 and the heating coils 2 and 3 can be reduced. Thus, the height dimension from the top board 20 to the plate 1 can be suppressed.

Figure 2A:
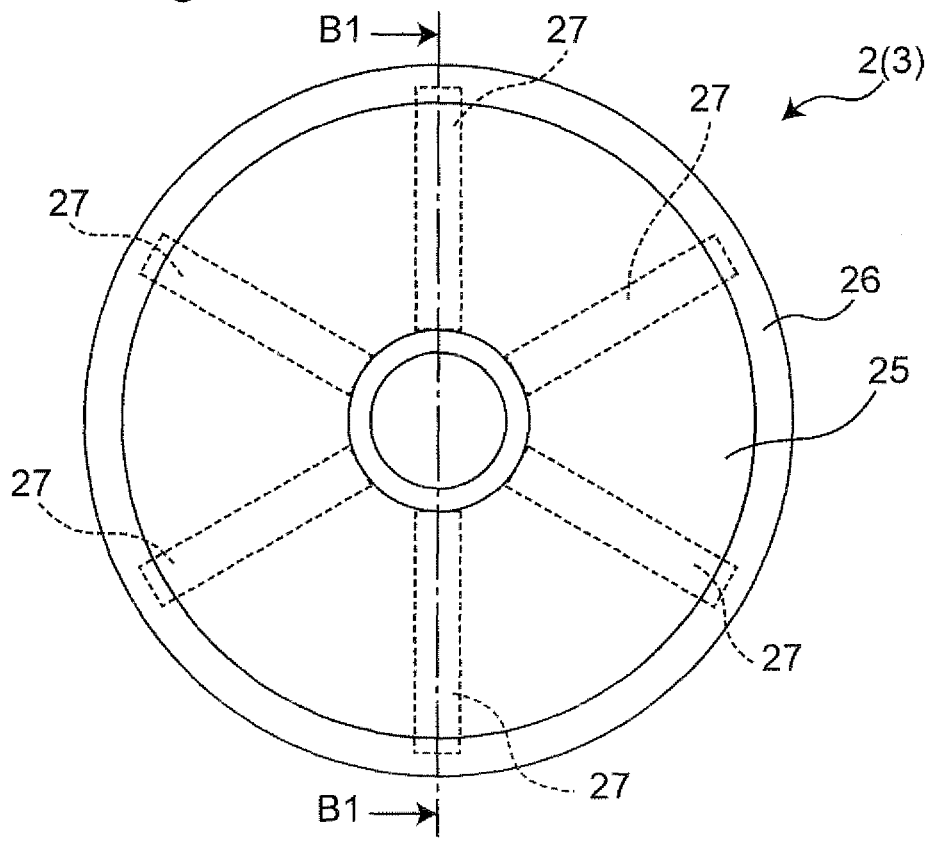
FIG. 2A is a plan view of a portion around a heating coil provided to the induction heating cooker shown in FIG. 1.

Next, the specific structure of the heating coil 2 will be described in detail with reference to FIGS. 2A and 2B. Note that, because the heating coil 3 is structured substantially bilaterally symmetrically to the heating coil 2, the description will representatively be given of the heating coil 2 herein. FIG. 2A is a plan view of a portion around the heating coil, and FIG. 2B is a cross-sectional view taken along line B1-B1 in FIG. 2A.

The heating coil 2 has a substantially ring-shaped winding 25, a ring-shaped support plate 26 structured with an electrical insulating material, and a plurality of rod-shaped magnetic field shielding magnetic materials 27 such as ferrite cores.

Figure 2B:
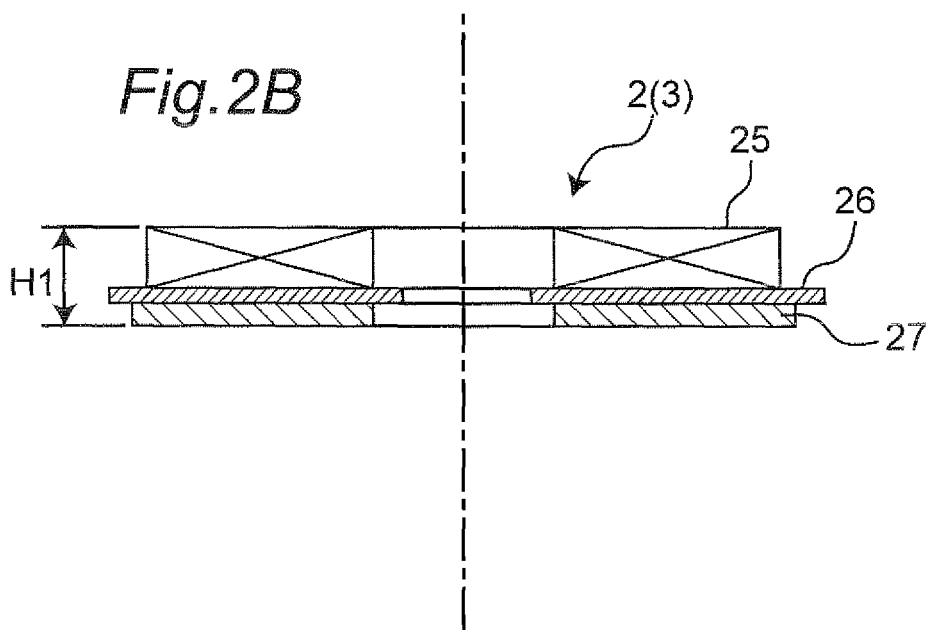
FIG. 2B is a cross-sectional view taken along line B1-B1 in FIG. 2A.

As shown in FIG. 2B, the winding 25 is fixed on the support plate 26. The winding 25 has elemental wires which are mainly made of materials having small electrical resistance and excellent heat conductivity, such as copper, aluminum, and the like. The winding 25 is formed by coating the surface of the elemental wires with an insulating material, thereafter bundling the coated elemental wires into bunch wires each made up of a plurality of such coated elemental wires, and winding the bundled bunch wires around to be substantially ring shaped (spiral shaped). The elemental wires used as the winding 25 are supplied from the inverter device 5 with a high frequency current of 20 kHz or more. Accordingly, the diameter of each elemental wire is set to 0.4 mm or less, in order to suppress the surface resistance. In a case where the material of the heating-target object is a non-magnetic material such as aluminum, the elemental wires used as the winding 25 are supplied from the inverter device 5 with a high frequency current of 50 kHz or more. In such an induction heating cooker that inductively heats the heating-target object being a non-magnetic material, the diameter of each of the elemental wires is preferably more smaller, e.g., about 0.1 mm.

As in the foregoing description, when a high frequency current is supplied to the winding 25 prepared in accordance with the material of the heating-target object, a high frequency magnetic field is generated from the winding 25. If this high frequency magnetic field reaches ferrous metal, then the ferrous metal is inductively heated. That is, in a case where the flange 7 is structured with a ferrous metal plate, the flange 7 is inductively heated. In order to prevent such an event, at the bottom surface of the support plate 26, a plurality of magnetic field shielding magnetic materials 27 are radially disposed about the center portion of the support plate 26. By the magnetic field shielding magnetic materials 27, the direction of the high frequency magnetic field from the winding 25 toward the flange 7 is changed (by having the high frequency magnetic field collected on the magnetic field shielding magnetic materials 27). Thus, the high frequency magnetic field is suppressed from reaching the flange 7.

The height of the heating coil 2 is height H1, which is obtained by summing the respective heights of the winding 25, the support plate 26, and the magnetic field shielding magnetic materials 27. As the height H1 is increased, the height H from the surface of the top board 20 to the top surface of the plate 1, i.e., the step height between the top board 20 and the plate 1 is increased. An increased step height impairs work efficiency in placing a cooking vessel on the plate 1, or cooking work efficiency in moving the cooking vessel on the plate 1 for cooking. In other words, it becomes awkward to use as the kitchen unit. Accordingly, it is preferable that the height H1 is as low as possible.

In order to reduce the height H1, in the first embodiment, the winding 25 of the heating coil 2 is smaller in thickness than the conventional ones. The winding 25 of the heating coil 2 is formed by winding around the bunch wire made up of a plurality of bundled elemental wires as described above. The inductance L of the heating coil 2 can be calculated by the number of winds of the bunch wire of the winding 25 (number of turns) and the diameter of the heating coil 2. More specifically, the inductance L of the heating coil 2 can be calculated by the formula: $L \propto (\text{diameter of the heating coil}) \times (\text{number of turns})^2$. As can be seen from the formula, the inductance L of the heating coil 2 is increased as the diameter of the heating coil 2 is increased. Further, if the winding 25 is wound having the bunch wire flattened out such that the cross-sectional shape of the bunch wire is changed from a circular shape to an elliptical shape (or a rectangular shape), then despite the unchanged number of turns, the inductance L is increased by an amount of increase in the diameter of the heating coil. Accordingly, for the purpose of securing a prescribed required inductance L when using a flattened bunch wire that brings about an increase in diameter of the heating coil 2, the number of turns should be reduced. The bunch wire of the winding 25 can easily be flattened out. Additionally, by flattening out the bunch wire of the winding 25, the height of the bunch wire can be reduced. Hence, a reduction in thickness of the heating coil 2 can be realized.

Figure 3A:
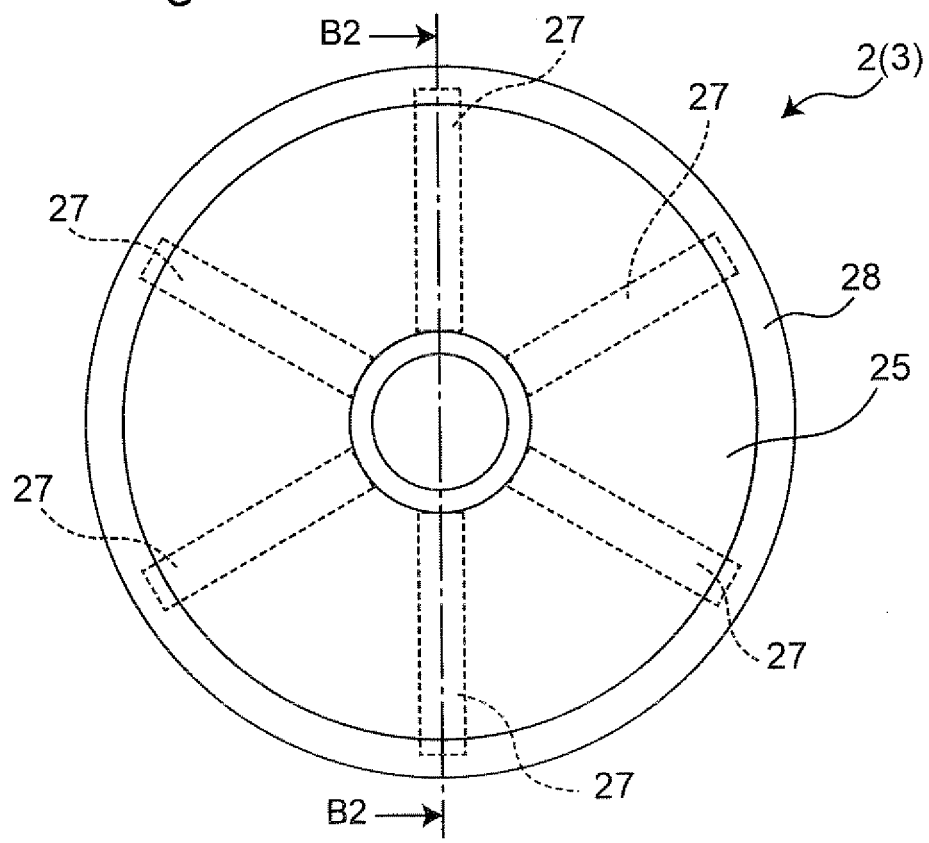
FIG. 3A is a plan view showing a variation of a portion around the heating coil provided to the induction heating cooker shown in FIG. 1.
Figure 3B:
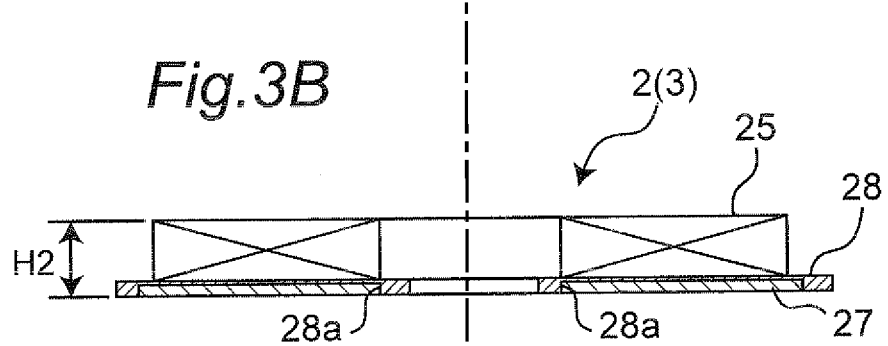
FIG. 3B is a cross-sectional view taken along line B2-B2 in FIG. 3A.

It is noted that, in the foregoing description, the magnetic field shielding magnetic materials 27 are directly bonded to the support plate 26 and, therefore, a reduction in thickness of the support plate 26 is difficult. However, by structuring the support plate 28 as shown in FIGS. 3A and 3B, a reduction in thickness of the support plate 28 can be attained. Specifically, forming a concave portion 28a for containing each of the magnetic field shielding magnetic materials 27 on the bottom surface of the support plate 28 such that the magnetic field shielding magnetic materials 27 are each embedded in the concave portion 28a eliminates the need for securing the thickness of the support plate 28 from the viewpoint of holding the magnetic field shielding magnetic materials 27. Accordingly, the thickness of the support plate 28 can be reduced to the utmost limit of securing insulation between the heating coil 2 and the magnetic field shielding magnetic materials 27. With such a structure, the height H2 as a result of stacking the winding 25, the support plate 28, and the magnetic field shielding magnetic materials 27 can be reduced and, hence, a further reduction in thickness of the heating coil 2 can be realized.

It is noted that our life research revealed that the step height between the top board 20 and the plate 1 is preferably suppressed to 20 mm or less. Accordingly, for example, when the thickness of the plate 1 is 5 mm, it is preferable that the height of the heating coil container space 16 is 15 mm or less. In this case, considering that it is preferable to provide a clearance between heating coils 2 and 3 and the plate 1, or between the heating coil 1 and the flange 7, it is preferable that the thickness of the heating coils 2 and 3 is designed to be 10 mm or less.

Now, a description will be given of the operation, effect, and the like of the induction heating cooker structured as above.

When using the induction heating cooker, the user places a heating-target object such as a cooking vessel at a determined position (a position immediately above the heating coil where magnetic coupling with the heating coil 2 or 3 in the outer casing 15 is intense) on the plate 1, and enters an instruction to start heating to a console (not shown). When the instruction to start heating is entered to the console (not shown), a high frequency current by the inverter device 5 is supplied to the heating coil 2 or 3. The winding 25 of the heating coil 2 or 3 generates a high frequency magnetic field induced by the high frequency current, and the high frequency magnetic field is supplied to the heating-target object. By the high frequency magnetic field supplied to the heating-target object, an eddy current is generated at the surface layer portion of the heating-target object such as a cooking vessel. The heating-target object generates heat by the eddy current and a high frequency resistance of the heating-target object itself. Using this heat generation (induction heating), the user can carry out various types of cooking. In order for the induction heating to be carried out efficiently, it is important to improve the magnetic coupling between the heating coil 2 or 3 and the heating-target object such as a cooking vessel. To this end, it is preferable to design the outer diameter of the heating coil 2 or 3 and the outer diameter of heated portion (for example, the bottom diameter of the cooking vessel) to be identical to each other.

In the first embodiment, because the heating coils 2 and 3 can be disposed in the heating coil container space 16 formed on the right and left portion of the flange 7, the size and disposition of the heating coils 2 and 3 can be determined irrespective of the size of the container portion 8. Further, the distance between the heating coils 2 and 3 can be set to be wide in order to prevent contact between the heating-target objects when a plurality of heating-target objects are placed on the plate 1. Still further, because the outer diameter of each of the heating coils 2 and 3 is not affected by the size of the container portion 8, the outer diameter can be set in accordance with a heating-target object whose bottom diameter is great. For example, in a case where a heating coil that is generally employed in conventional structures whose outer diameter is about 180 to 200 mm is used as each of the heating coils 2 and 3, the wide distance between the heating coils 2 and 3 can be secured while the size of their respective outer diameters are maintained. Alternatively, even when the outer diameter of each of the heating coils 2 and 3 is increased to be 200 mm or more, heating-target objects each having a great bottom diameter can efficiently be heated, without narrowing the distance between the heating coils 2 and 3. Additionally, by disposing both the left side heating coil 2 and the right side heating coil 3 in the heating coil container space 16 over the flange 7, the distance between the heating coils 2 and 3 can be increased.

Further, according to the first embodiment, because the heating coils 2 and 3 are each disposed at a position higher than the top surface of the top board 20, the height of the container portion 8 can be increased than that of conventional ones. Thus, for example, the interior height of the roaster 6 can be designed to be higher than that of conventional ones. Note that, in this case, a prescribed clearance must be secured between the roaster 6 and the left side heating coil 2, in order for the left side heating coil 2 positioned over the roaster 6 to be protected from an adverse effect of the heat generation of the roaster 6.

Further, in the first embodiment, as shown in FIG. 1B, at each outer circumferential portion of the heating coils 2 and 3, a magnetic field shielding member 17 formed by a ring-shaped non-magnetic metal such as aluminum is disposed for suppressing magnetic field leakage from the heating coils 2 and 3. The magnetic field shielding members 17 have the following effect: to generate an induced current from a magnetic field that is leaked externally without being absorbed by the heating-target object, out of the magnetic field generated by the heating coils 2 and 3; and to generate from the magnetic field shielding members 17 by the induced current a magnetic field reverse to the magnetic field leakage, so as to cancel out the magnetic field leakage. Therefore, each of the magnetic field shielding members 17 is preferably greater in cross-sectional area, as its own heat generation becomes smaller. Further, when respective distances between the magnetic field shielding members 17 and the heating coils 2 and 3 are too close, the magnetic field leakage cancellation effect becomes excessively great, whereby heating efficiency is impaired. In contrast, according to the structure of the first embodiment, because the size of the outer diameter of each of the heating coils 2 and 3 is not affected by the container portion 8, with less restrictions on the shape and position of the magnetic field shielding members 17, an improvements can be achieved both in heating efficiency and magnetic field shielding performance.

Still further, in the first embodiment, although it is not illustrated, a cooling fan that produces cooling air is disposed in the container portion 8, so as to carry out forced cooling of the inverter device 5 (including any heat emitting component such as a switching element). The heating coils 2 and 3 are cooled by the cooling air of the cooling fan after carrying out the forced cooling of the inverter device 5, or by cooling air partially branched from the cooling air from the cooling fan. It is also possible to provide a dedicated cooling fan (not shown) for cooling the heating coils 2 and 3, so as to directly cool the heating coils 2 and 3. In the first embodiment, because the height of the heating coil container space 16 is reduced and the front-rear and right-left dimension of the heating coil container space 16 is increased, the airflow resistance in the heating coil container space 16 is great. Accordingly, it may seem that the cooling air of the cooling fan from the inside of the container portion 8 does not reach one portions of the heating coils 2 and 3 positioned in the heating coil container space 16. However, the winding 25 of each of the heating coils 2 and 3 is structured with the elemental wires having excellent heat conductivity, e.g., copper wires. Therefore, by the other portions of the heating coils 2 and 3 positioned in the container portion 8 being cooled by the cooling air of the cooling fan, the one portions of the heating coils 2 and 3 positioned in the heating coil container space 16 are also cooled by heat conduction. Accordingly, provided that the one portions of the heating coils 2 and 3 are positioned in the heating coil container space 16, the entire heating coils 2 and 3 can be cooled. It is noted that, when the area of the other portions of the heating coils 2 and 3 positioned in the container portion 8 is small, the cooling effect on the heating coils 2 and 3 may not fully be obtained. Accordingly, the heating coils 2 and 3 are preferably disposed having at least half their outer diameters positioned in the container portion 8.

Second Embodiment

Figure 4A:
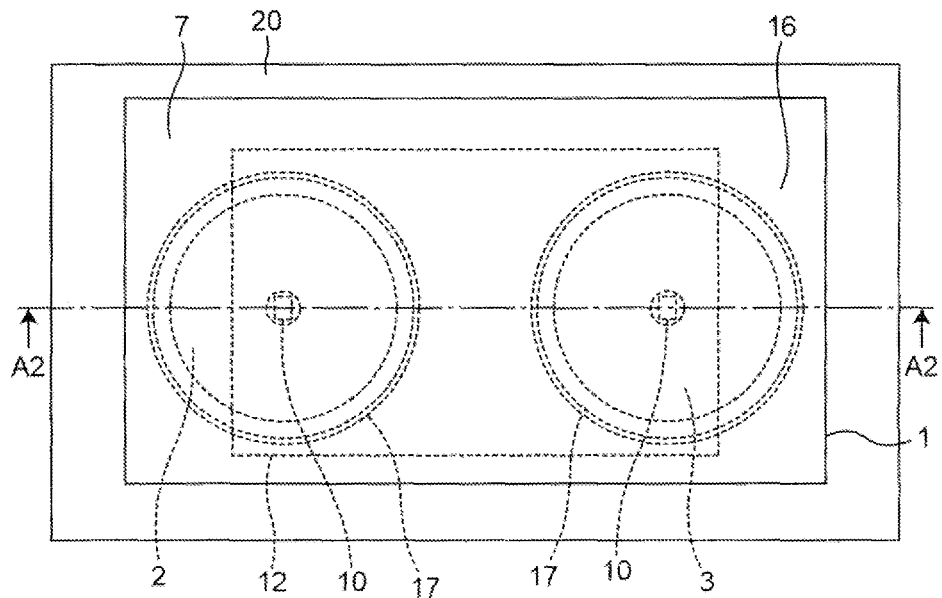
FIG. 4A is a plan view of a kitchen unit provided with an induction heating cooker according to a second embodiment of the present invention.
Figure 4B:
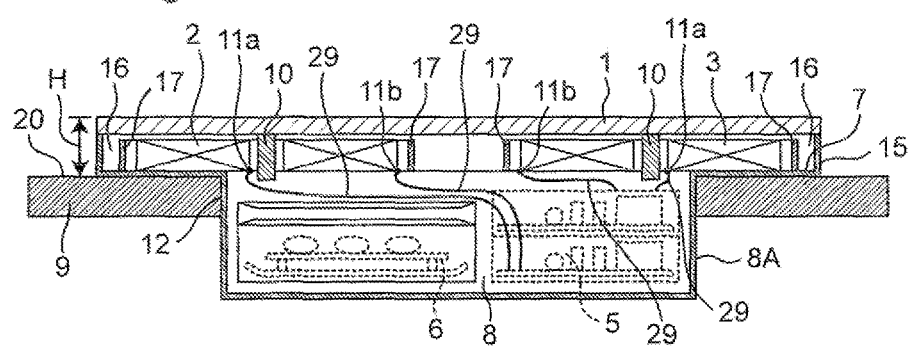
FIG. 4B is a cross-sectional view taken along line A2-A2 in FIG. 4A.

The structure of an induction heating cooker according to a second embodiment of the present invention will be described with reference to FIGS. 4A and 4B. FIG. 4A is a plan view of a kitchen unit provided with the induction heating cooker according to the second embodiment of the present invention. FIG. 4B is a cross-sectional view taken along line A2-A2 in FIG. 4A. The induction heating cooker according to the second embodiment is different from the induction heating cooker according to the first embodiment in that it further includes temperature detection sensors 10, each being an exemplary temperature detection device for detecting the temperature of the heating-target object, and in that both end portions 11a and 11b of each of the windings respectively structuring the heating coils 2 and 3 are disposed in the container portion 8.

As shown in FIG. 4B, the temperature detection sensors 10 are disposed to abut on the back surface of the plate 1, so as to be capable of detecting the temperature of the heating-target objects placed on the plate 1. Further, the temperature detection sensors 10 are disposed to be positioned at the center portions of respective substantially ring-shaped heating coils 2 and 3 positioned in the container portion 8. That is, the temperature detection sensors 10 are disposed not inside the heating coil container space 16, but inside the container portion 8.

Therefore, in accordance with the second embodiment, because the height of the heating coil container space 16 can be set without being affected by the height dimension of the temperature detection sensors 10, the height of the heating coil container space 16 can further be reduced. As a result, the height H from the top surface of the top board 20 to the top surface of the plate 1 can be reduced, whereby ease of use as a kitchen unit can be improved.

Further, for example, in a case where light sensors that detect the infrared radiation from the heating-target object, i.e., infrared radiation radiated from the heating-target object, are used as the temperature detection sensors 10, their height dimension is increased as compared to sensors such as thermistors and, hence, the structure of the second embodiment is particularly useful. Specifically, in a case where the temperature detection sensors 10 are light sensors, a light guiding portion for guiding the infrared radiation from the heating-target object on the plate 1 to a light receiving portion of each of the light sensors via the plate 1 is required. Still further, in order to reduce the effect of the magnetic field of the heating coils 2 and 3 on the light receiving portion of each of the light sensors, some schemes are required, such as to cover the light receiving portions of the light sensors with a magnetic field shielding material, or to dispose the light receiving portions away from the heating coils 2 and 3. Accordingly, in a case where the light sensors that detect the infrared radiation are used as the temperature detection sensors 10, the structure of the second embodiment is particularly useful.

Still further, according to the second embodiment, as shown in FIG. 4B, the both end portions of each of the windings respectively structuring the heating coils 2 and 3, i.e., an inner circumferential wind starting portion 11a of the winding and an outer circumferential wind ending portion 11b, are both disposed in the container portion 8. Thus, the wiring work of conductor wires 29 connecting between the wind starting portion 11a or the wind ending portion 11b and the inverter device 5 is facilitated, and the height H from the top surface of the top board 20 to the top surface of the plate 1 can be suppressed. Accordingly, the ease of use as a kitchen unit can be improved. In contrast, for example in a case where the wind starting portion 11a or the wind ending portion 11b is disposed in the heating coil container space 16, space for wiring the conductor wires 29 each electrically connecting between the wind starting portion 11a or the wind ending portion 11b and the inverter device 5 becomes necessary in the heating coil container space 16. Therefore, at least by the height (diameter) of the conductor wires 29, the height H from the top surface of the top board 20 to the top surface of the plate 1 is increased.

It is noted that, although the temperature detection sensors 10 are disposed at respective center portions of the heating coils 2 and 3 in the second embodiment, the present invention is not limited thereto. For example, the temperature detection sensors 10 may be disposed between the windings of the heating coils 2 and 3 where an increase in the temperature by the induction heating is great. Further, the temperature detection sensor 10 is not limited to be disposed per heating coil, and a plurality of temperature detection sensors 10 may be disposed per heating coil. This makes it possible to sense the temperature of the heating-target object even more correctly.

Third Embodiment

Figure 5A:
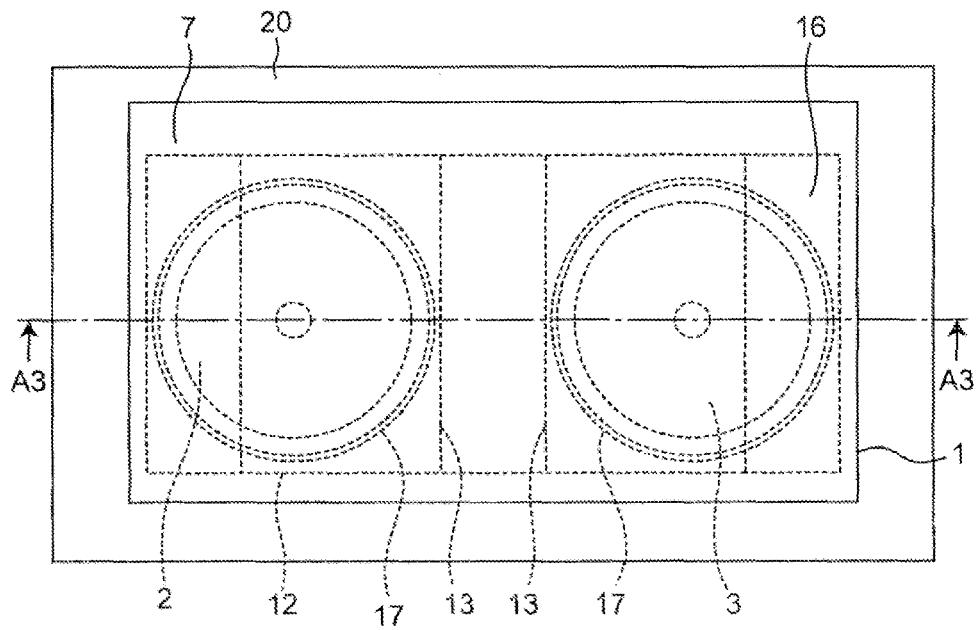
FIG. 5A is a plan view of a kitchen unit provided with an induction heating cooker according to a third embodiment of the present invention.
Figure 5B:
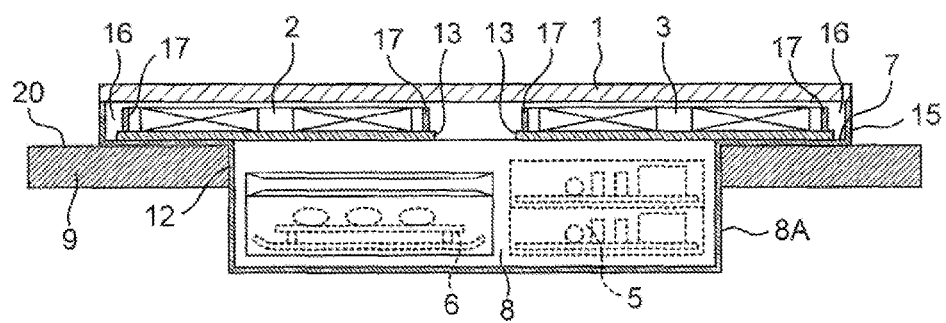
FIG. 5B is a cross-sectional view taken along line A3-A3 in FIG. 5A.

The structure of an induction heating cooker according to a third embodiment of the present invention will be described with reference to FIGS. 5A and 5B. FIG. 5A is a plan view of a kitchen unit provided with the induction heating cooker according to the third embodiment of the present invention. FIG. 5B is a cross-sectional view taken along line A3-A3 in FIG. 5A. The induction heating cooker according to the third embodiment is different from the induction heating cooker according to the first embodiment in that metal plates 13 each being a non-magnetic material having high electrical conductivity and low magnetic permeability (also referred to as a magnetic field shielding element) such as an aluminum plate are disposed between the heating coil 2 and the flange 7 and between the heating coil 3 and the flange 7, respectively.

Here, in a case where the top board 20 of the kitchen counter 9 is structured with a magnetic material, for example with magnetic stainless steel, the top board 20 may possibly be inductively heated by the heating coils 2 and 3 over the flange 7. In the first embodiment, the high frequency magnetic field generated by the heating coils 2 and 3 is suppressed from reaching the top board 20 by taking measures such as structuring the flange 7 with a ferrous metal plate and providing the heating coils 2 and 3 with the magnetic field shielding magnetic materials 27. However, in a case where the flange 7 is structured with a material other than metal, or where an opening is formed at part of the flange 7, the high frequency magnetic field generated by the heating coils 2 and 3 reaches the top board 20. Further, provision of the magnetic field shielding magnetic materials 27 solely cannot cause the high frequency magnetic field emitted from the heating coils 2 and 3 toward the top board 20 to change its direction by 100%.

In contrast, in the third embodiment, because the non-magnetic metal plates 13 having high electrical conductivity and low magnetic permeability are disposed between the heating coils 2 and 3 and the flange 7, the high frequency magnetic field generated by the heating coils 2 and 3 can more surely be prevented from reaching the top board 20. Accordingly, the top board 20 can be prevented from being inductively heated. Further, in a case where the flange 7 is structured with a ferrous metal plate, the flange 7 can be prevented from being inductively heated by the high frequency magnetic field generated from the heating coils 2 and 3. Thus, any adverse effect on the top board 20 caused by the heat generation of the flange 7, for example, thermal degradation, thermal discoloration, and the like, of the top board 20 made of artificial marble can be suppressed.

Further, in a case where plate members having high heat conductivity such as aluminum plates are used as the metal plates 13, by blowing the cooling air of the cooling fan to the plate members, the entire heating coils 2 and 3 can be cooled via the plate members. That is, owing to the heat conductivity of the metal plates 13, one portions of the heating coils 2 and 3 positioned in the heating coil container space 16 can also efficiently be cooled. It is noted that, in this case, it is preferable that the surfaces of the metal plates 13 are partially exposed in the container portion 8. This facilitates the cooling air of the cooling fan to be blown in the metal plates 13, thereby improving the cooling efficiency.

It is noted that disposition of the metal plates 13 in the heating coil container space 16 requires space in the heating coil container space 16 to allow for the thickness of the metal plates 13 (for example, 0.5 mm). However, in a case where the metal plates 13 are not provided in the heating coil container space 16, it becomes necessary to provide clearances, e.g., each measuring about 10 mm, between the heating coils 2 and 3 and the top board 20 for cooling the heating coils. As a consequence, such disposition of the metal plates 13 in the heating coil container space 16 is superior to the latter case in reducing the height H from the top board 20 to the top plate of the plate 1.

Fourth Embodiment

Figure 6A:
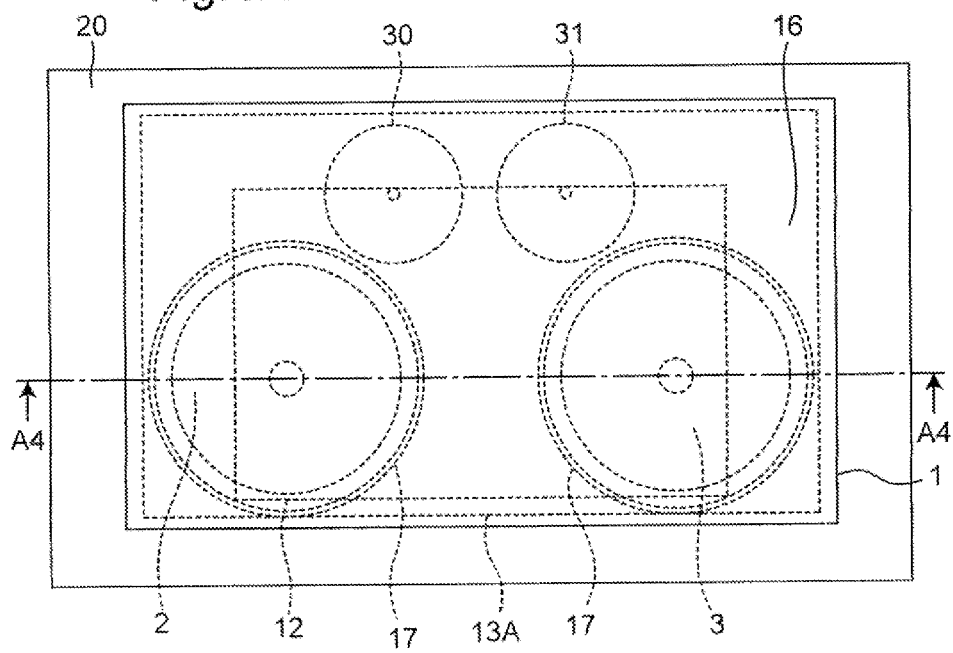
FIG. 6A is a plan view of a kitchen unit provided with an induction heating cooker according to a fourth embodiment of the present invention.
Figure 6B:
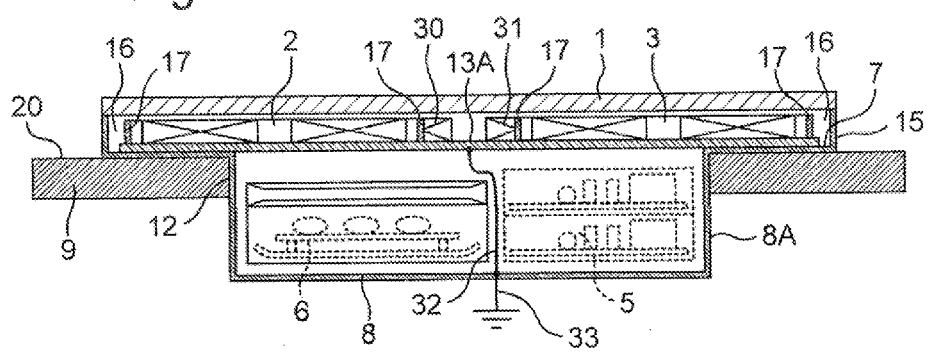
FIG. 6B is a cross-sectional view taken along line A4-A4 in FIG. 6A.

The structure of an induction heating cooker according to a fourth embodiment of the present invention will be described with reference to FIGS. 6A and 6B. FIG. 6A is a plan view of a kitchen unit provided with the induction heating cooker according to the fourth embodiment of the present invention. FIG. 6B is a cross-sectional view taken along line A4-A4 in FIG. 6A. The induction heating cooker according to the fourth embodiment is different from the induction heating cooker according to the first embodiment in that it includes: a metal plate 13A between the heating coils 2 and 3 and the flange 7; and heating coils 30 and 31.

Similarly to the metal plates 13 described above, the metal plate 13A is structured with a non-magnetic material having excellent heat conductivity, such as an aluminum plate. The metal plate 13A has a size large enough to cover the opening 12 of the top board 20. As shown in FIGS. 6A and 6B, the heating coils 30 and 31 are disposed on the metal plate 13A, together with the heating coils 2 and 3. Viewing the bottom side of FIG. 6A as the front side and the top side of FIG. 6A as the rear side, the heating coil 30 is disposed on the rear left side, and the heating coil 31 is disposed on the rear right side. The heating coil 2 is disposed on the front left side, and the heating coil 3 is disposed on the front right side. Similarly to the heating coils 2 and 3, the heating coils 30 and 31 each have a substantially ring-shaped winding 25, a ring-shaped support plate 26 structured with an electrical insulating material, and a plurality of rod-shaped magnetic field shielding magnetic materials 27 such as ferrite cores. The outer diameter of each of the heating coils 30 and 31 is formed to be smaller than the outer diameter of each of the heating coils 2 and 3.

According to the fourth embodiment, because a plurality of heating coils 2, 3, 30, and 31 are disposed on a single non-magnetic metal plate 13A, ease of convenience of disposition of the heating coils can be improved. Further, the radiation noises generated from a plurality of heating coils 2, 3, 30, and 31 can be shielded by a single non-magnetic metal plate 13A. It is noted that, in order to effectively reduce the radiation noises, as shown in FIG. 6B, the metal plate 13A and a grounding terminal 33 of the outer casing 15 should be connected to each other by a wiring 32, so as to ground the metal plate 13A. What is necessary is just to connect one single metal plate 13A and the grounding terminal 33 of the outer casing 15 with one single wiring 32 and, hence, excellent convenience of assembly can be obtained.

Further, in a case where a plate member having high heat conductivity such as an aluminum plate is used as the metal plate 13A, by blowing the cooling air of the cooling fan in the plate member, the entire heating coils 2, 3, 30, and 31 can be cooled via the plate member. In particular, in an induction heating cooker provided with four heating coils as in the fourth embodiment, it is effective to structure the metal plate 13A with a plate member having high heat conductivity. Specifically, because the size of the opening 12 is constant even in a case where the induction heating cooker is provided with four heating coils, in a case where each heating coil has an outer diameter equivalent to the conventional ones, the heating coil container space 16 must be increased in size. In this case, it becomes more difficult for the cooling air of the cooling fan to reach one portions of the heating coils positioned in the heating coil container space 16. Therefore, it is particularly effective for the induction heating cooker provided with four or more heating coils to have its metal plate 13A structured with a plate member having high heat conductivity.

Although the metal plate 13A and the flange 7 are separately structured in the fourth embodiment, it is also possible to integrally structure those components using a material having low magnetic permeability and high electrical conductivity such as aluminum. In this manner also, the effect similar to that described above can be obtained.

The major induction heating cookers for use in the European region are the ones provided with four or more heating coils, as shown in FIGS. 6A and 6B. With the structure of the fourth embodiment, by changing the size or shape of the flange 7, the metal plate 13A and the plate 1 for use in the European region capable of accepting disposition of four heating coils can be used for induction heating cookers for use in Japan. Accordingly, components such as the metal plate, the plate, and the like can be used in common globally. Further, unitization of such components allows their globally common application, whereby productivity can be improved.

Fifth Embodiment

Figure 7A:
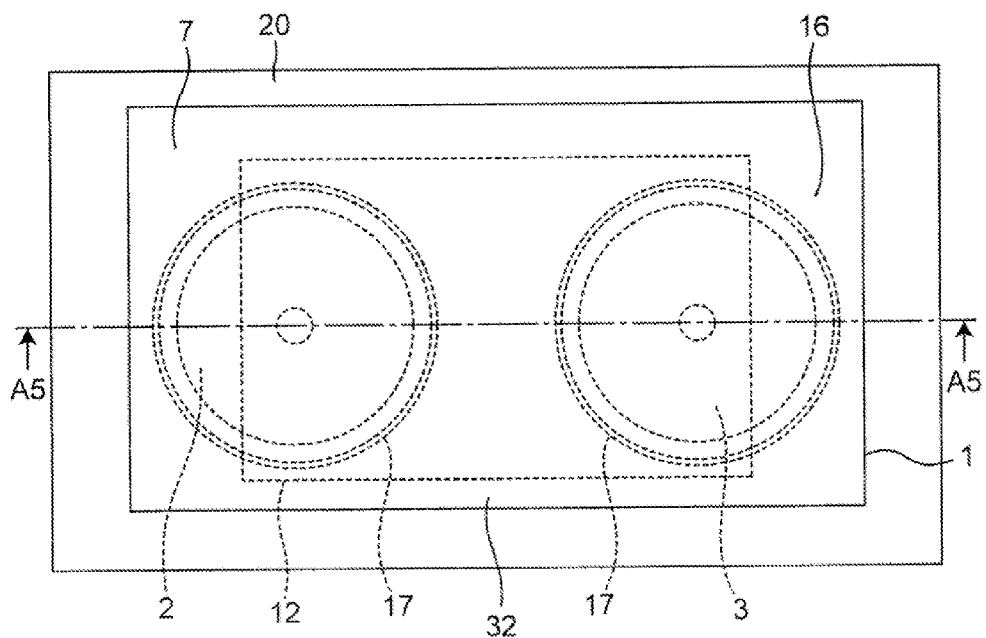
FIG. 7A is a plan view of a kitchen unit provided with an induction heating cooker according to a fifth embodiment of the present invention.
Figure 7B:
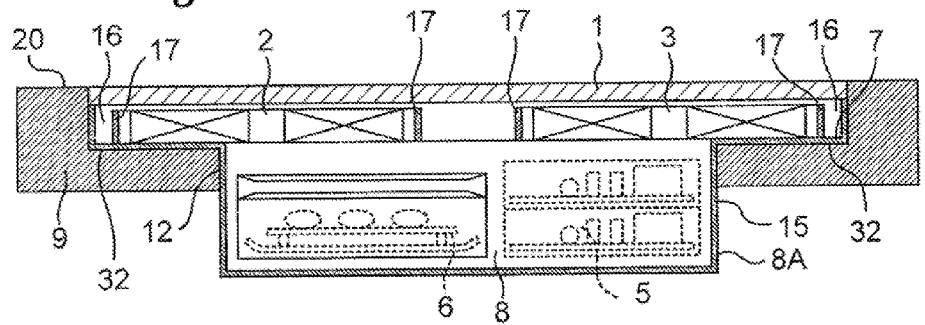
FIG. 7B is a cross-sectional view taken along line A5-A5 in FIG. 7A.

A kitchen unit according to a fifth embodiment of the present invention will be described with reference to FIGS. 7A and 7B. FIG. 7A is a plan view of the kitchen unit according to the fifth embodiment of the present invention. FIG. 7B is a cross-sectional view taken along line A5-A5 in FIG. 7A. The kitchen unit according to the fifth embodiment is different from the kitchen unit according to the first embodiment in that a recess portion 32 is formed around the opening 12 of the top board 20, so as to place the flange 7 of the induction heating cooker in the recess portion 32. As shown in FIG. 7A, the depth of the recess portion 32 is set such that the top surface of the plate 1 is level with the top surface of the top board 20 in a state where the installation of the induction heating cooker is complete.

According to the fifth embodiment, while it is necessary to form the recess portion 32 at the top board 20 of the existing kitchen counter 9, it becomes possible to eliminate the step height between the plate 1 and the top board 20, to improve the ease of use of the kitchen unit.

It is noted that, although the depth of the recess portion 32 is set such that the top surface of the plate 1 is level with the top surface of the top board 20 in the present fifth embodiment, the present invention is not limited thereto. Even in a case where the depth of the recess portion 32 is set as appropriate in accordance with the workability of the recess portion 32, the step height between the top surface of the plate 1 and the top surface of the top board 20 can surely be reduced at least by that depth. Hence, the ease of use of the kitchen unit can be improved.

Sixth Embodiment

Figure 8A:
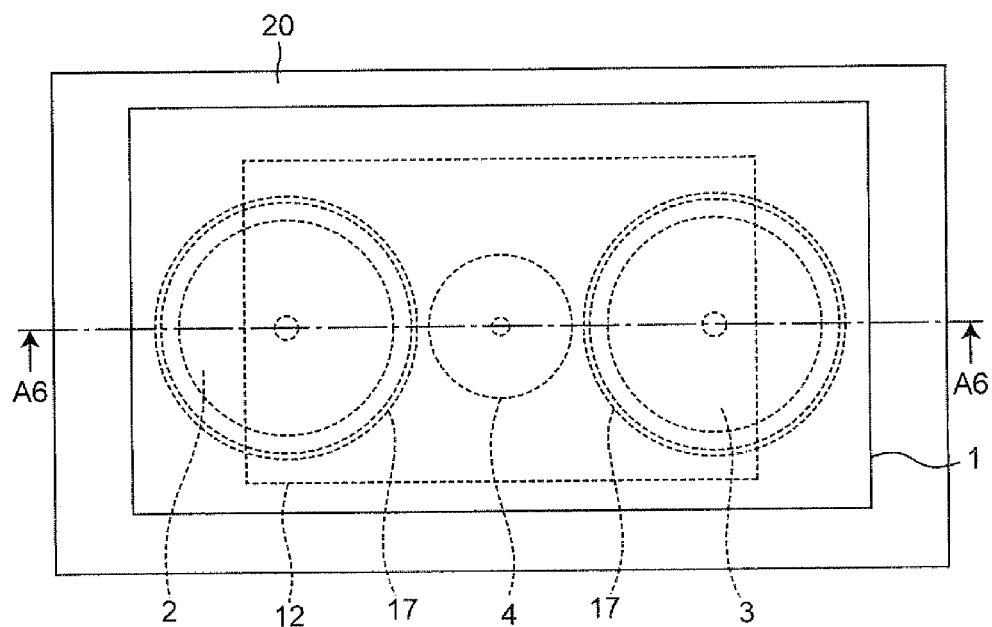
FIG. 8A is a plan view of a kitchen unit provided with an induction heating cooker according to a sixth embodiment of the present invention.
Figure 8B:
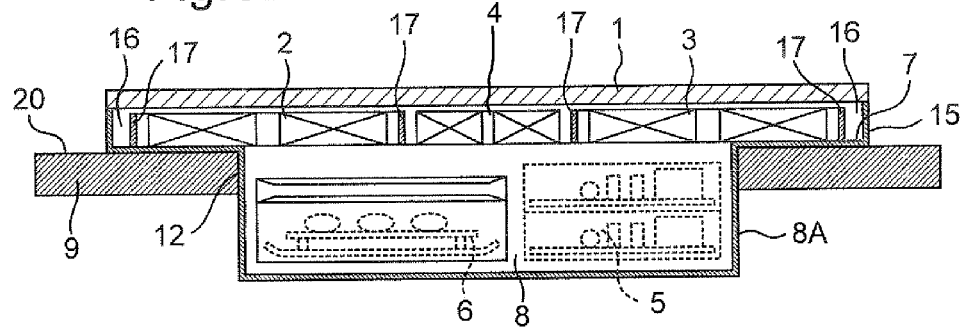
FIG. 8B is a cross-sectional view taken along line A6-A6 in FIG. 8A.

The structure of an induction heating cooker according to a sixth embodiment of the present invention will be described with reference to FIGS. 8A and 8B. FIG. 8A is a plan view of a kitchen unit provided with the induction heating cooker according to the sixth embodiment of the present invention. FIG. 8B is a cross-sectional view taken along line A6-A6 in FIG. 8A. The induction heating cooker according to the sixth embodiment is different from the induction heating cooker according to the first embodiment in that it includes a center heating coil 4 between the left side heating coil 2 and the right side heating coil 3. As shown in FIGS. 8A and 8B, the left side heating coil 2, the right side heating coil 3, and the center heating coil 4 are disposed to form a substantially lateral line.

According to the sixth embodiment, because all the heating coils 2, 3, and 4 are disposed to form a substantially lateral line, the user can easily look into a heating-target object, irrespective of whichever heating coil the heating-target object is placed on.

Further, according to the sixth embodiment, by placing one portions of the heating coils 2 and 3 in the heating coil container space 16, the heating coils can be disposed as being away from each other. Thus, contact among the heating-target objects respectively placed on the heating coils 2, 3, and 4 can be prevented, whereby the ease of use can be improved.

It is noted that, the rated output of the inverter device 5 supplying the left side heating coil 2 and the right side heating coil 3 with a high frequency current is preferably greater than the rated output of the inverter device 5 supplying the center heating coil 4 with a high frequency current. Thus, it becomes possible to cook with a plurality of heating-target objects at right and left wide places at high temperatures, whereby the ease of use can be improved. This is particularly advantageous when two heating-target objects each having great bottom diameter are simultaneously heated.

Further, by setting the center heating coil 4 to be smaller in rated output than the left side heating coil 2 and the right side heating coil 3, the components of the inverter device 5 that supplies power to the center heating coil 4 can be reduced in size. Thus, it becomes possible to employ a cost-effective structure while securing wide space in the container portion 8. It is noted that, when all of the plurality of heating coils 2, 3, and 4 are operated, it is effective to allot different rated outputs to them, because the total electric power is limited.

Seventh Embodiment

The structure of an induction heating cooker according to a seventh embodiment of the present invention will be described with reference to FIG. 9. FIG. 9 is a cross-sectional view showing a manner of installing the induction heating cooker according to the seventh embodiment of the present invention in a kitchen counter. The induction heating cooker according to the seventh embodiment is different from the induction heating cooker according to the first embodiment in that an annular seal member 35 (in a rectangular shape in the seventh embodiment) is provided in the outward direction of the bottom surface of the flange 7.

When the induction heating cooker according to the seventh embodiment is installed in the kitchen counter 9, the container portion 8 of the outer casing 15 should be inserted into the opening 12 of the top board 20, and the flange 7 should be placed on the top board 20 surrounding the opening 12 having the annular seal member 35 interposed therebetween.

According to the seventh embodiment, because the annular seal member 35 is disposed in the outward direction of the bottom surface of the flange 7, when the induction heating cooker is installed in the kitchen counter 9, the seal member 35 is interposed between the top board 20 and the flange 7. Thus, even if a clearance is present between the top board 20 and the flange 7, the clearance can be filled with the seal member 35, so as to prevent any foreign object such as liquid splattered from the boiled over heating-target object from entering inside the container portion 8 through the clearance. This is particularly useful with the flange 7 of a large size which is prone to create the clearance.

Eighth Embodiment

Figure 10A:
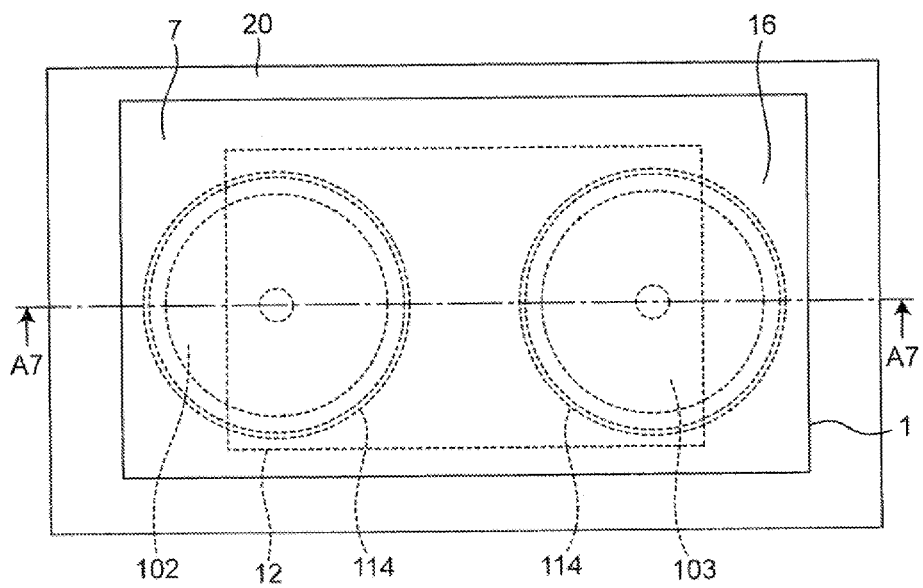
FIG. 10A is a plan view of a kitchen unit provided with an induction heating cooker according to an eighth embodiment of the present invention.
Figure 10B:
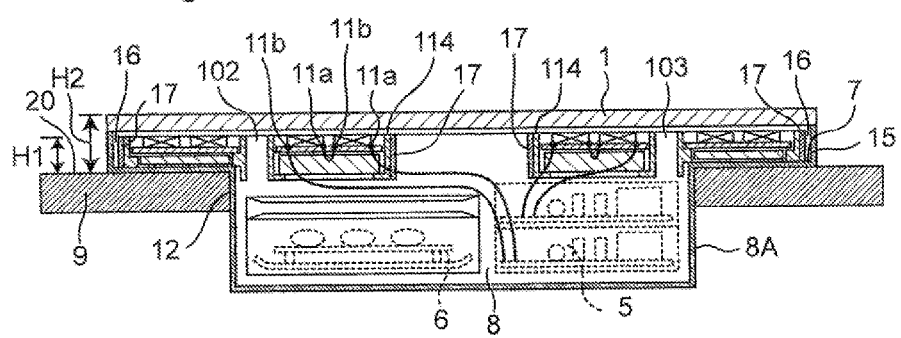
FIG. 10B is a cross-sectional view taken along line A7-A7 in FIG. 10A.
Figure 11:
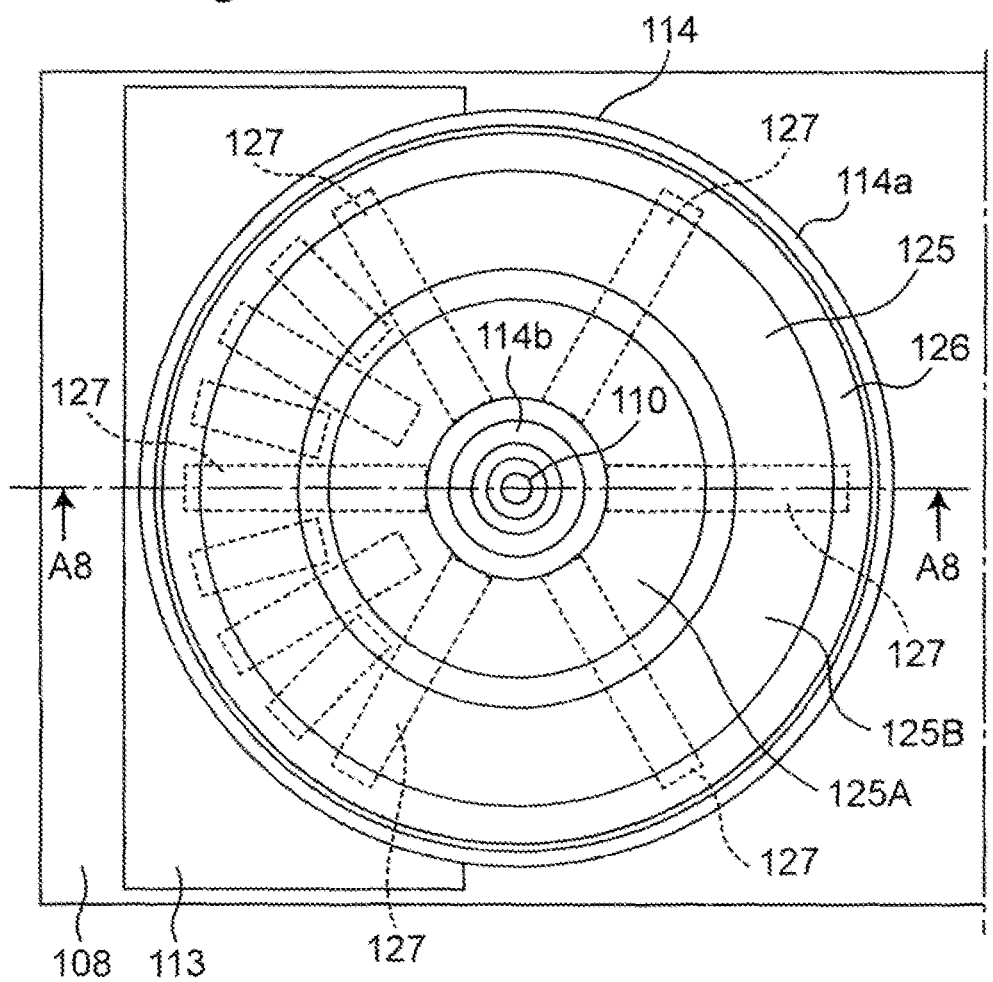
FIG. 11 is a top view of a portion around a heating coil provided to the induction heating cooker according to the eighth embodiment of the present invention.
Figure 12:
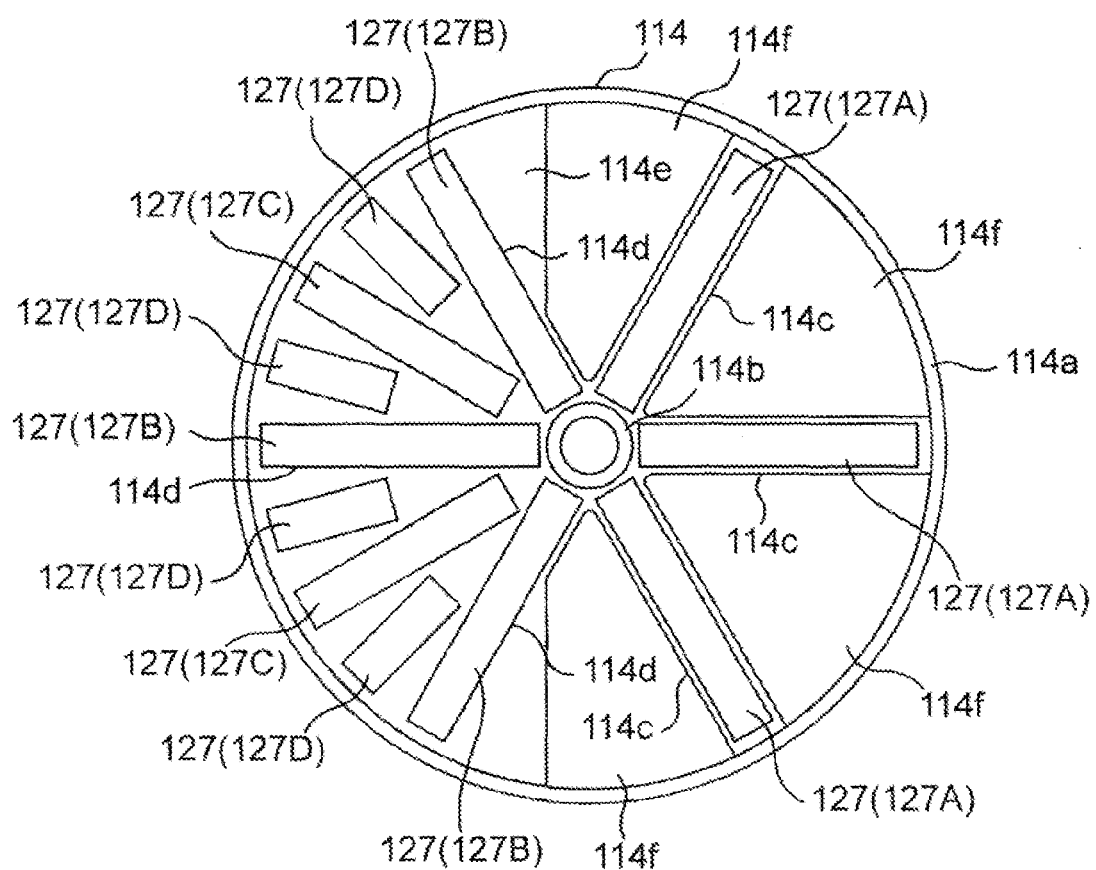
FIG. 12 is a bottom view of the portion around the heating coil provided to the induction heating cooker according to the eighth embodiment of the present invention.
Figure 13:
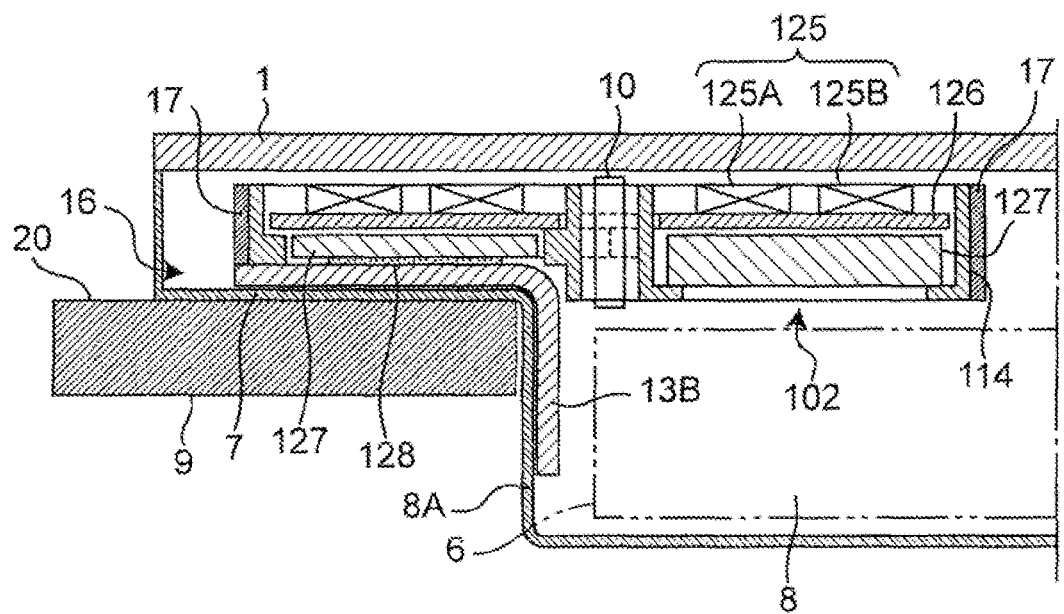
FIG. 13 is a cross-sectional view taken along line A8-A8 in FIG. 11.

The structure of an induction heating cooker according to an eighth embodiment of the present invention will be described with reference to FIGS. 10A and 10B, and FIGS. 11 to 13. FIG. 10A is a plan view of a kitchen unit provided with the induction heating cooker according to the eighth embodiment of the present invention. FIG. 10B is a cross-sectional view taken along line A7-A7 in FIG. 10A. FIG. 11 is a top view of a portion around a heating coil provided to the induction heating cooker according to the eighth embodiment of the present invention, and FIG. 12 is a bottom view thereof. FIG. 13 is a cross-sectional view taken along line A8-A8 in FIG. 11. The induction heating cooker according to the eighth embodiment is different from the induction heating cooker according to the first embodiment in that it includes heating coils 102 and 103 and a metal plate 13B, in place of the heating coils 2 and 3 and the metal plate 13.

First, the heating coil 102 will be described. Because the heating coil 103 is structured substantially bilaterally symmetrically to the heating coil 102, the description will representatively be given of the heating coil 102 herein. The heating coil 102 has a substantially ring-shaped winding 125, a ring-shaped support plate 126 structured with an electrical insulating material, a substantially ring-shaped support member 114, and a plurality of rod-shaped magnetic field shielding magnetic materials 127 such as ferrite cores.

As shown in FIG. 13, the winding 125 of the heating coil 102 is fixed on the support member 126. The winding 125 has a structure in which elemental wires mainly made of a material of small electrical resistance and excellent heat conductivity are wound as being divided into an inner diameter side and on an outer diameter side. In the following, the inner diameter side portion of the winding 125 is referred to as an inner winding 125A, and the outer diameter side portion of the winding 125 is referred to as an outer winding 125B. The inner winding 125A and the outer winding 125B are structured to be identical to each other in cross-sectional area, the number of elemental wires, and the lay of the elemental wires. The reason for structuring the winding 125 in such a manner is as follows.

Specifically, the high frequency magnetic field generating from the winding of a general heating coil is prone to concentrate to the substantially intermediate portion in the radial direction of the winding. Accordingly, the intensity of the high frequency magnetic field generated from the winding becomes the maximum at a portion around the central portion in the radial direction of the winding, and becomes minimum at a portion around each of the both end portions in the radial direction of the winding. The greater the greatness to weakness range of the high frequency magnetic field, the greater the variations in heating, which are detrimental to the cooking performance. Further, the temperature of a winding of a general heating coil when generating heat is lower at the portion around each of the both end portions in the radial direction of the winding than the portion around the central portion in the radial direction of the winding (the portion around the central portion T≈(R+S)/2, where R is the inner diameter and S is the outer diameter). Such a difference in temperature between the portion around the central portion and the portion around each of the both end portions becomes greater as the number of turns of the winding becomes greater, i.e., the difference between R and S becomes greater.

In contrast, in a case where the elemental wires of the winding 125 are wound as being divided into the inner diameter side and the outer diameter side as in the eighth embodiment, there exists no portion corresponding to the portion around the central portion. Therefore, the greatness to weakness range of the high frequency magnetic field and the temperature difference become small. Accordingly, the variations in heating can be suppressed. Further, when the inner winding 125A and the outer winding 125B are electrically connected to each other in series, the current passing through the inner winding 125A and that passing through the outer winding 125B assume the identical value. Still further, by structuring each of the inner winding 125A and the outer winding 125B with the bunch wire made up of the same elemental wires, the inner winding 125A and the outer winding 125B will have the same current loss and heat value per unit area, because the windings are identical in cross-sectional area, the number of elemental wires, and the lay of the elemental wires.

As shown in FIGS. 11 and 12, the support member 114 has an outer frame 114a and an inner frame 114b which are cylindrical and concentrically disposed. Further, the support member 114 has: frame-like support portions 114c that radially extend between the inner frame 114b and the outer frame 114a and into which magnetic materials 127A, which will be described later, can be fit; and a sectorial support portion 114e provided with a plurality of hole portions 114d into which magnetic materials 127B, 127C, and 127D, which will be described later, can be fit.

The outer frame 114a is attached to the outer circumferential portion of the support plate 126. To the outer circumferential portion of the outer frame 114a, the magnetic field shielding member 17 described above is attached. The portions other than the support portions 114c between the inner frame 114b and the outer frame 114a are void portions 114f, as shown in FIG. 12. The void portions 114f are provided at the positions corresponding to the container portion 8, and through the void portions 114*f*, cooling air can be blown in the windings 125A and 125B from below. In other words, the heating coils 102 and 103 can fully be cooled.

As shown in FIG. 12, the magnetic field shielding magnetic materials 127 are structured with a plurality of magnetic materials 127A, 127B, 127C, and 127D which are radially disposed. The magnetic materials 127A and 127B are disposed at substantially equal angular intervals circumferentially. Each magnetic material 127C is disposed between the magnetic materials 127B adjacent to each other in the heating coil container space 16. Each magnetic material 127D is disposed between the magnetic material 127B and the magnetic material 127C adjacent to each other in the heating coil container space 16. In this manner, a total of nine magnetic field shielding magnetic materials 127 (127B, 127C, and 127D) are disposed in the heating coil container space 16. On the other hand, a total of three magnetic field shielding magnetic materials 127 (127A) are disposed in the container portion 8. That is, the number of the magnetic field shielding magnetic materials 127 positioned in the heating coil container space 16 is greater than the number of the magnetic field shielding magnetic materials 127 positioned in the container portion 8.

The magnetic materials 127A, 127B, 127C, and 127D are formed to be identical to one another in circumferential (short lengthwise) length (lateral width). Further, the magnetic materials 127A are formed to be identical to the magnetic materials 127B in radial (long lengthwise) length. That is, the magnetic materials 127A and the magnetic materials 127B are formed to be identical to each other in two-dimensional shape.

The magnetic materials 127C are formed to be shorter than the magnetic materials 127A in radial length. The magnetic materials 127D are formed to be shorter than the magnetic materials 127A, 127B, and 127C in radial length. The magnetic materials 127A, 127B, 127C, and 127D are disposed such that their respective radially outer end portions are concyclically disposed. Thus, on the outer frame 114*a* side having a great diameter, the space between each of the magnetic field shielding magnetic materials 127 disposed in the heating coil container space 16 is reduced, whereby an excellent magnetic field shielding performance is secured.

Further, in the eighth embodiment, the thickness of each of the magnetic materials 127B, 127C, and 127D disposed in the heating coil container space 16 is designed to be thinner than the thickness of each of the magnetic materials 127A disposed in the container portion 8. Here, it is noted that each dimension is set such that the total cross-sectional area (circumferential length (lateral width)×thickness) for the magnetic materials 127B, 127C, and 127D and the total cross-sectional area (circumferential length (lateral width)×thickness) for the magnetic materials 127A become approximately the same. Alternatively, each dimension is set such that the total volume for the magnetic materials 127A and the total volume for the magnetic materials 127B, 127C, and 127D become approximately the same. This makes it possible to obtain approximately the same the magnetic field shielding performance on the heating coil container space 16 side and on the container portion 8 side.

Still further, in the eighth embodiment, the components are disposed such that the height position of the top surface of each of the magnetic materials 127B, 127C, and 127D disposed in the heating coil container space 16 and the height position of the top surface of each of the magnetic materials 127A disposed in the container portion 8 become substantially identical to each other. As described in the foregoing, the magnetic materials 127B, 127C, and 127D are formed to be smaller in thickness than the magnetic materials 127A. Therefore, by the disposition described above, the height position of the bottom surface of each of the magnetic materials 127B, 127C, and 127D is positioned higher than the height position of the bottom surface of each of the magnetic materials 127A. This makes it possible to reduce the heating coil container space 16 in height than that in the foregoing embodiments. That is, the step height between the top board 20 and the plate 1 can be reduced, so as to improve the ease of use as a kitchen unit.

Next, a description will be given of the metal plate 13B. The metal plate 13B is disposed between the heating coil 102 and the flange 7. The metal plate 13B is a metal plate structured with a non-magnetic material having high electrical conductivity and low magnetic permeability, such as an aluminum plate. At the top surface of the metal plate 13B, the magnetic materials 127B, 127C, and 127D are attached with an adhesive 128. This prevents backlash of the magnetic materials 127B, 127C, and 127D. It is noted that, because the thickness of the adhesive 128 is very small, the height of the heating coil container space 16 can be set to be smaller than in a case where the magnetic materials 127B, 127C, and 127D are attached to the metal plate 13B each with a separate attachment element. Further, because the distance between the magnetic materials 127B, 127C, and 127D and the metal plate 13B is short (as small as the thickness of the adhesive 128), the heat transfer or radiation heat from the winding 125, or heat due to self-heating of the magnetic field shielding magnetic materials 127 can easily be distributed to the metal plate 13B. Accordingly, a reduction in the temperature of the magnetic field shielding magnetic materials 127 and the winding 125 can effectively be achieved.

The portion of the metal plate 13B positioned in the container portion 8 is structured to be bent so as to be away from the heating coil 102, thereby exposing its surface. That is, the metal plate 13B is formed to have an L-shaped cross section so as to conform to the flange 7 and the vertical wall of the container portion 8 of the outer casing 15. Thus, the foregoing cooling air of the cooling fan (not shown) can effectively be blown in the metal plate 13B, whereby the cooling efficiency of the heating coil 102 can be improved.

Ninth Embodiment

Figure 14:
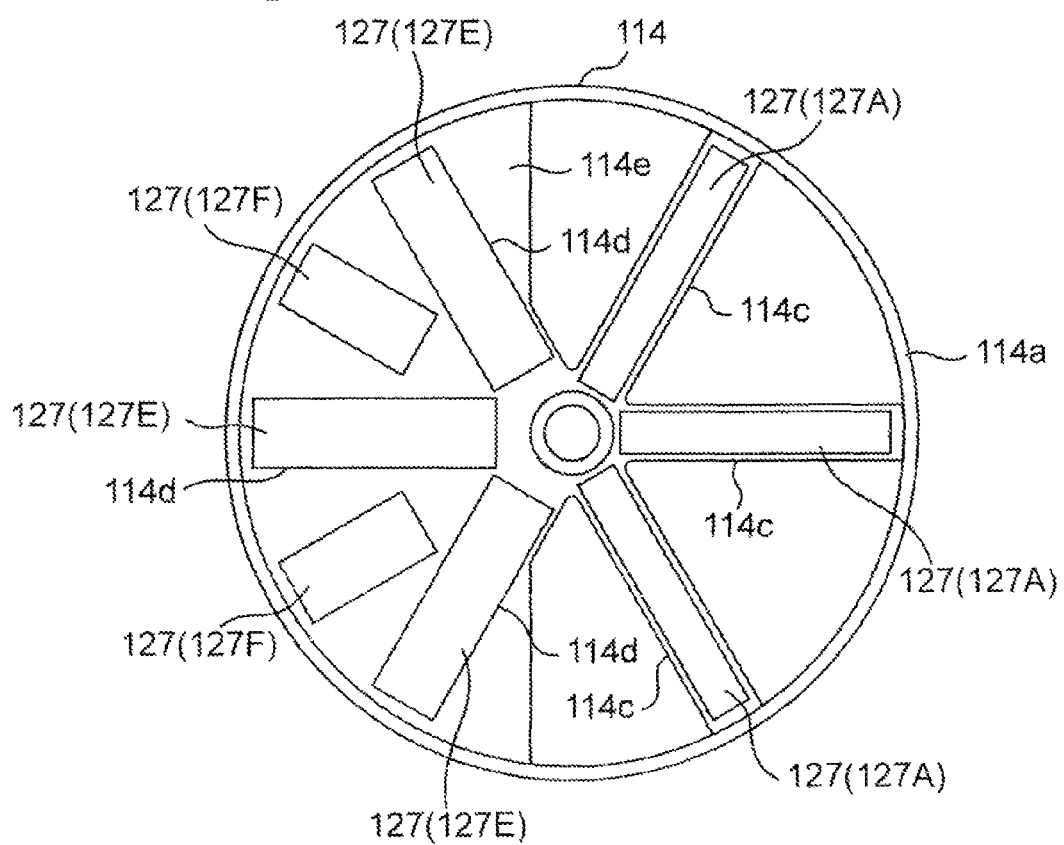
FIG. 14 is a bottom view of a portion around a heating coil provided to an induction heating cooker according to a ninth embodiment of the present invention.

The structure of an induction heating cooker according to a ninth embodiment of the present invention will be described with reference to FIG. 14. FIG. 14 is a bottom view of a portion around a heating coil provided to the induction heating cooker according to the ninth embodiment of the present invention. The induction heating cooker according to the ninth embodiment is different from the induction heating cooker according to the eighth embodiment in that it includes magnetic materials 127E and 127F, in place of the magnetic materials 127B, 127C, and 127D.

As shown in FIG. 14, the magnetic materials 127E are disposed at substantially the same positions as the magnetic materials 127B, while being formed to be longer than the magnetic materials 127B in circumferential length (lateral width). Each magnetic material 127F is disposed between magnetic materials 127E adjacent to each other, while being formed to be longer than the magnetic materials 127B and 127C in the circumferential length (lateral width). The magnetic materials 127A, 127B, 127C, and 127D are disposed such that their respective radially outer end portions are concyclically disposed. Thus, on the outer frame 114*a* side having a great diameter, the space between the magnetic field shielding magnetic materials 127 disposed in the heating coil container space 16 is reduced, whereby an excellent magnetic field shielding performance is secured.

Further, in the ninth embodiment, the thickness of each of the magnetic materials 127B, 127C, and 127D disposed in the heating coil container space 16 is designed to be thinner than the thickness of the each of the magnetic materials 127A disposed in the container portion 8. Here, it is to be noted that each dimension is set such that the total cross-sectional area (circumferential length (lateral width)×thickness) for the magnetic materials 127E and 127F and the total cross-sectional area (circumferential length (lateral width)×thickness) for the magnetic materials 127A become approximately the same. It is further noted that the shape of each magnetic field shielding magnetic material 127 can arbitrarily be set so long as the total cross-sectional area or volume for the magnetic materials 127A and the total cross-sectional area or volume for the magnetic materials 127E and 127F become approximately the same.

According to the ninth embodiment, the effect similar to that of the foregoing embodiments can be obtained, and the number of the magnetic field shielding magnetic materials 127 can be reduced. In the ninth embodiment, in order to balance the magnetic field shielding performance on the heating coil container space 16 side and that on the container portion 8 side, it is designed such that the total cross-sectional area for the magnetic materials 127A and the total cross-sectional area for the magnetic materials 127E and 127F are the same. However, depending on the purpose, they may not necessarily be the same.

Tenth Embodiment

Figure 15:
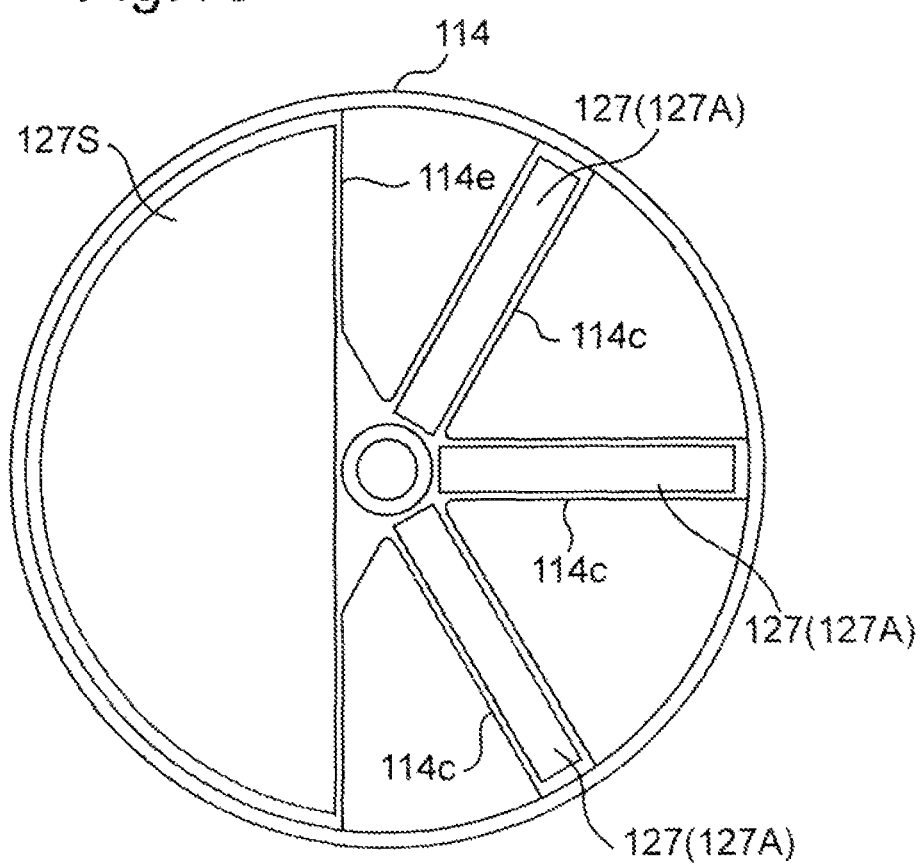
FIG. 15 is a bottom view of a portion around a heating coil provided to an induction heating cooker according to a tenth embodiment of the present invention.

The structure of an induction heating cooker according to a tenth embodiment of the present invention will be described with reference to FIG. 15. FIG. 15 is a bottom view of a portion around a heating coil provided to the induction heating cooker according to the tenth embodiment of the present invention. The induction heating cooker according to the tenth embodiment is different from the induction heating cooker according to the eighth embodiment in that it includes a sheet-like magnetic material 127S in place of the magnetic materials 127B, 127C, and 127D. The support portion 114e is provided with no hole portions 114d.

The magnetic material 127S has a sectorial shape which is substantially two-dimensionally the same as the support portion 114e, and is disposed below the support portion 114e. The thickness of the magnetic material 127S is smaller than the thickness of each of the magnetic materials 127A disposed in the container portion 8. Here, it is noted that each dimension is set such that the total cross-sectional area (lateral width×thickness) for the magnetic material 127S and the total cross-sectional area (lateral width×thickness) for the magnetic materials 127A become approximately the same. In this case, because the two-dimensional area of the magnetic material 127S becomes greater than that of the magnetic materials disposed in the heating coil container space 16 in the eighth and ninth embodiments, the magnetic material 127S is allowed to be the thinnest. Further, because the support portion 114e can substantially entirely be covered with the magnetic material 127S without any clearance, the magnetic field shielding performance can further be improved.

It is noted that, because the support portion 114e may not necessarily be provided in the tenth embodiment, the magnetic material 127S may be disposed at the position of the support portion 114e. In other words, the magnetic material 127S can integrally be formed with the support member 114.

In this case, the thickness of one portions of the heating coils 102 and 103 arranged in the heating coil container space 116 can further be reduced by the thickness of the support portion 114e.

Eleventh Embodiment

Figure 16A:
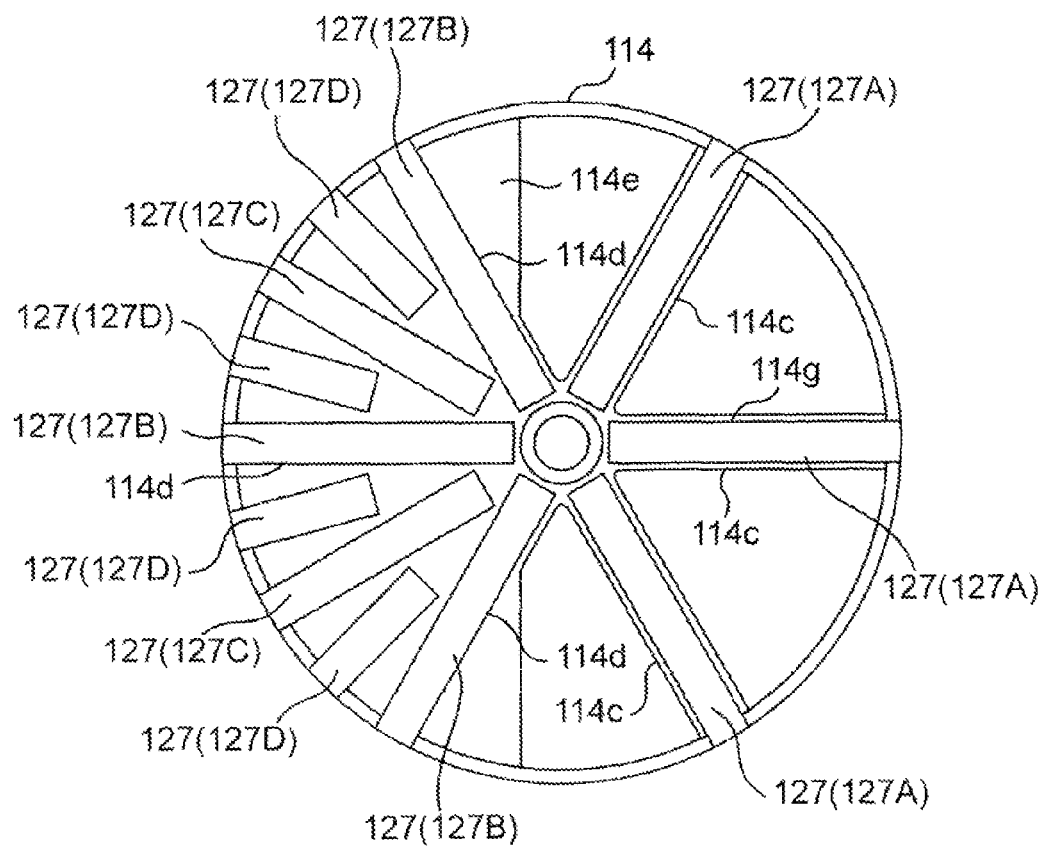
FIG. 16A is a bottom view of a portion around a heating coil provided to an induction heating cooker according to an eleventh embodiment of the present invention.
Figure 16B:
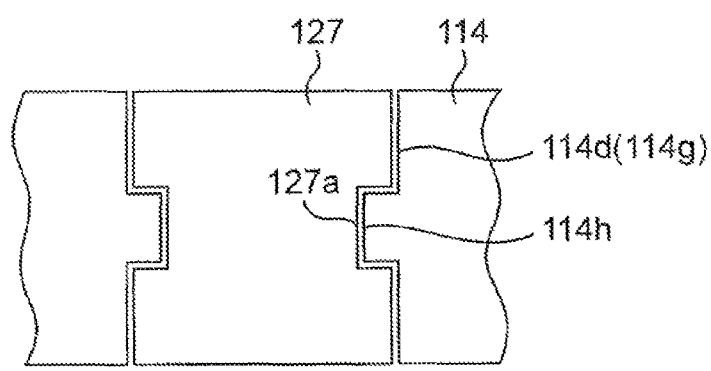
FIG. 16B is an enlarged side view showing a fit structure of a magnetic material of a magnetic member and an outer frame in the induction heating cooker according to the eleventh embodiment of the present invention.
Figure 17A:
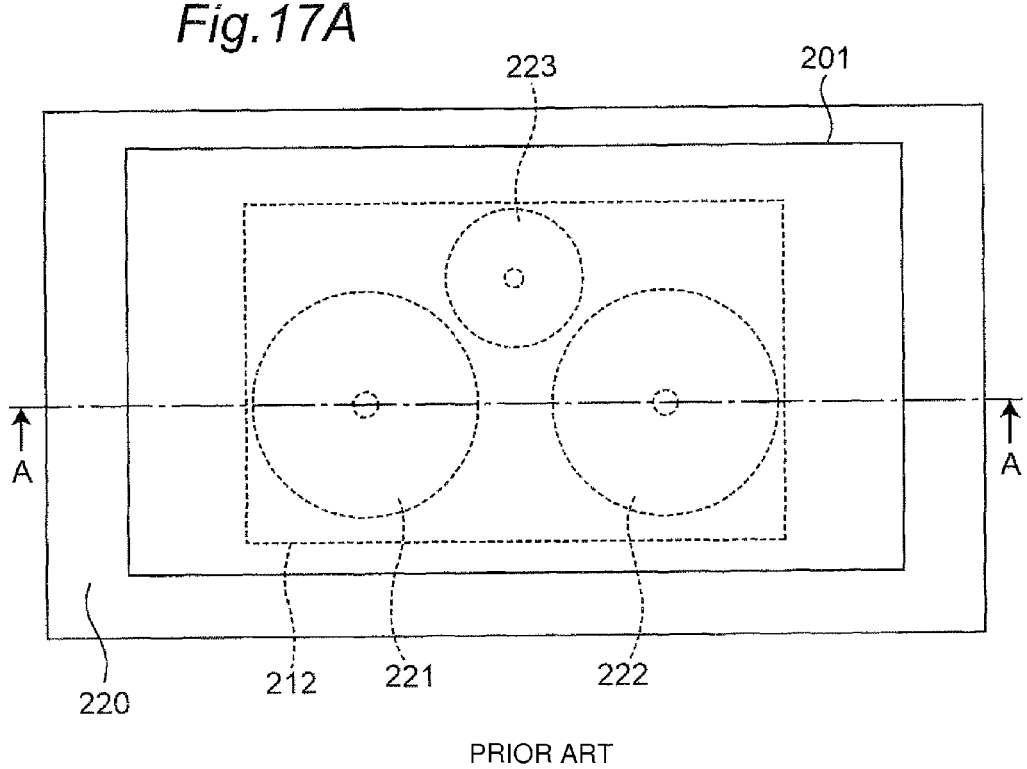
FIG. 17A is a plan view of a kitchen unit provided with a conventional induction heating cooker.
Figure 17B:
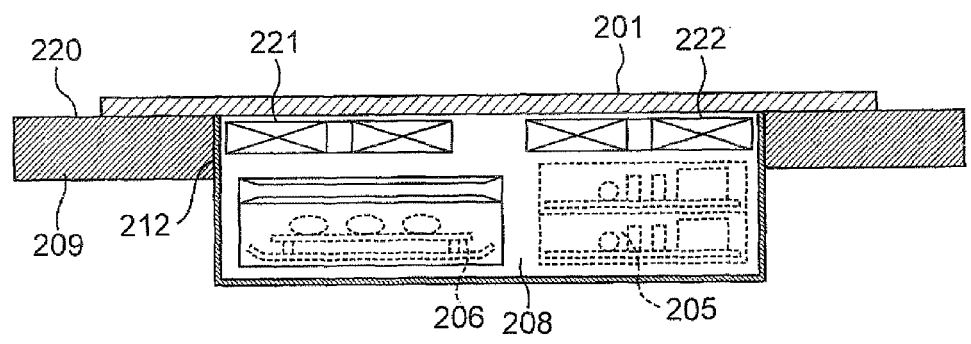
FIG. 17B is a cross-sectional view taken along line A-A in FIG. 17A.
Figure 18:
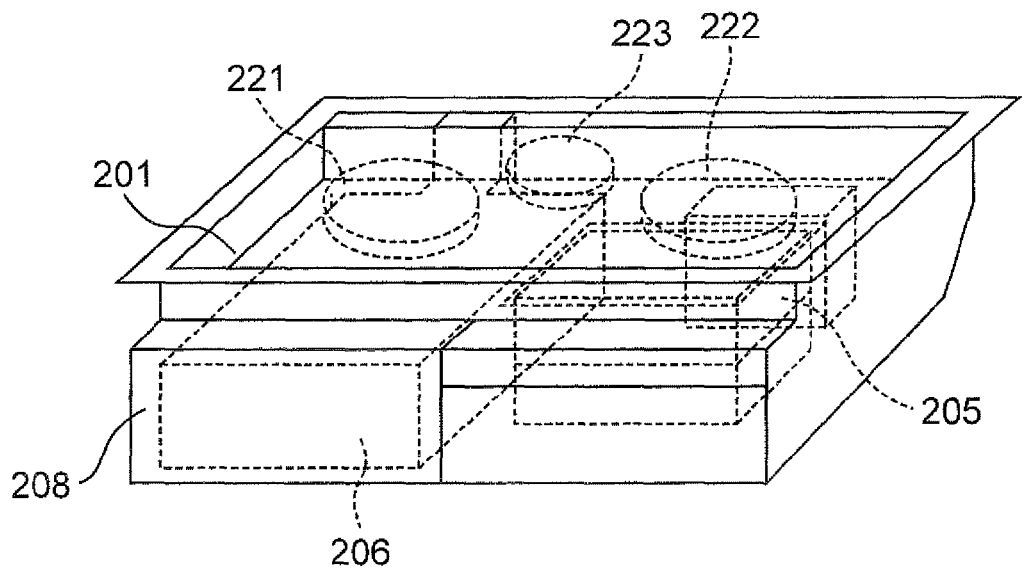
FIG. 18 is an interior perspective view of a conventional induction heating cooker.
Figure 19:
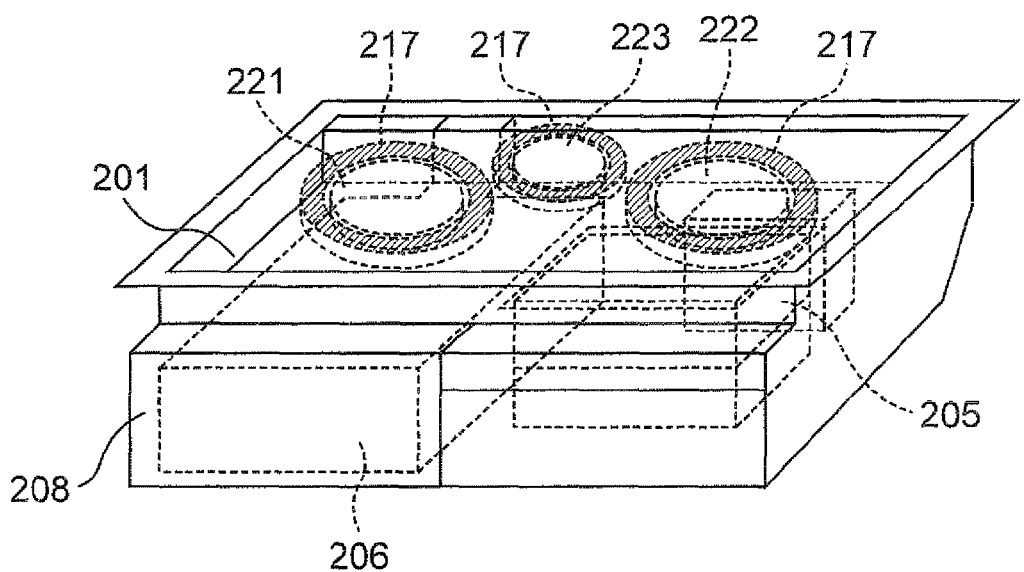
FIG. 19 is an interior perspective view of another conventional induction heating cooker.

The structure of an induction heating cooker according to an eleventh embodiment of the present invention will be described with reference to FIGS. 16A and 16B. FIG. 16A is a bottom view of a portion around a heating coil provided to the induction heating cooker according to the eleventh embodiment of the present invention. FIG. 16B is an enlarged side view showing a fit structure of a magnetic material of a magnetic member and an outer frame in the induction heating cooker according to the eleventh embodiment of the present invention. The induction heating cooker according to the eleventh embodiment is different from the induction heating cooker according to the eighth embodiment in that the magnetic field shielding magnetic materials 127 are structured to fit to the outer frame 114a.

As shown in FIG. 16A, the hole portions 114d of the support portion 114e and hole portions 114g of the support portion 114c are formed, having the outer frame 114a also cut out. As shown in FIG. 16B, at the side surface portion of each of the hole portions 114d and 114g, a projection portion 114h is formed so as to radially extend. At a side surface portion of each of the magnetic materials 127A, 127B, 127C, and 127D, a groove 127a that can fit to the projection portion 14h is formed so as to radially extend. Note that, for ease of illustration, FIG. 16B shows relatively great clearances between the magnetic materials 127A, 127B, 127C, and 127D, and the hole portions 114d (114g) of the support member 114. However, the clearances can be as minimized as possible, so long as it falls within a range where each projection portion 114h and each hole portion 114d (114g) can fit to each other, and where backlash is less prone to occur.

According to the eleventh embodiment, the need for using the adhesive 128 in disposing the magnetic materials 127A, 127B, 127C, and 127D on the metal plate 13B can be eliminated. Accordingly, the need for adhering the magnetic materials 127A, 127B, 127C, and 127D one by one with the adhesive 128 is eliminated, whereby mounting efficiency can largely be improved.

Further, according to the eleventh embodiment, allowing the magnetic field shielding magnetic materials 127 to be held by fitting by the outer frame 114a, the need for disposing any support member for the magnetic materials above and below the magnetic field shielding magnetic materials 127. Accordingly, the height of the heating coil container space 16 can further be reduced.

Still further, in the foregoing description, the magnetic materials 127A disposed on the container portion 8 side are also structured to fit to the outer frame 114a. However, it is less necessary for the container portion 8 side to reduce the height of the heating coil and, therefore, the structured as in the eighth to tenth embodiments may be employed.

Further, in the foregoing embodiments, it has been described that the support plate 126 is a rigid body for supporting the winding 25. However, it may not necessarily be a rigid body that can support a heavy load. For example, the support plate 126 may be a sheet for enhancing the insulating performance. Still further, in order to simplify the structure, the support plate 126 and the support member 114 may integrally be structured, such that the support member 114 supports also the winding 125. Still further, the support member 114 may be structured to be smaller than or substantially equal to the magnetic field shielding magnetic materials 127 in thickness, so as to allow the support plate 126 or the winding 125 to contact the magnetic field shielding magnetic materials 127. In this manner, the heating coil can be structured to be thinner than ever.

It is to be noted that, an appropriate combination of any of the foregoing various embodiments can achieve the effects that the embodiments respectively possess.

The induction heating cooker according to the present invention has heating coils whose size can freely be set without being restricted by the size of the opening of the cabinet of the kitchen unit. Therefore, it is useful for an induction heating cooker and the like used as being installed in a kitchen unit.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An induction heating cooker, comprising:
an outer casing for the induction heating cooker;
a plate for covering a top portion of the outer casing;
a heating coil for inductively heating a heating-target object placed on the plate; and
an inverter device for supplying the heating coil with a high frequency current, wherein the outer casing has:
a container receptacle that forms a container portion containing the inverter device, and that is inserted into an opening formed at a top board; and
a flange that is formed to extend in an outward direction from a top portion of the container receptacle, and that is placed on the top board surrounding the opening, and wherein
a heating coil container space for containing one portion of the heating coil is formed above the top board between the flange and the plate, and the one portion of the heating coil is disposed in the heating coil container space.

2. The induction heating cooker according to claim 1, further comprising
a metal plate comprising a non-magnetic material having heat conductivity disposed between the flange and the one portion of the heating coil, wherein one portion of the metal plate has a surface exposed in the container portion.

3. The induction heating cooker according to claim 2, wherein
the induction heating cooker includes a plurality of heating coils, each of which is identical with the heating coil, disposed on a single piece of the metal plate.

4. The induction heating cooker according to claim 1, wherein
the heating coil has a winding for generating a high frequency magnetic field induced by the high frequency current, and
both end portions of the winding are disposed in the container portion.

5. The induction heating cooker according to claim 1, further comprising:
a temperature detection device that detects a temperature of the heating-target object, wherein
the temperature detection device is disposed at a center portion of the heating coil and in the container portion.

6. The induction heating cooker according to claim 1, wherein
the heating coil has:
a winding for generating a high frequency magnetic field induced by the high frequency current;
a support plate for supporting the winding; and
a magnetic field shielding magnetic material disposed below the winding, for collecting the high frequency magnetic field generated by the winding, wherein
the support plate has a concave portion for containing the magnetic field shielding magnetic material, and containment of the magnetic field shielding magnetic material in the concave portion yields a total height dimension for the support plate and the magnetic field shielding magnetic material smaller than a total thickness for the support plate and the magnetic field shielding magnetic material.

7. The induction heating cooker according to claim 1, wherein
the heating coil has:
a winding for generating a high frequency magnetic field induced by the high frequency current; and
a plurality of magnetic field shielding magnetic materials disposed below the winding, for collecting the high frequency magnetic field generated by the winding, wherein
the plurality of magnetic field shielding magnetic materials is disposed such that at least one of the plurality of magnetic field shielding magnetic materials is disposed in each of the heating coil container space and the container portion, and
the magnetic field shielding magnetic material disposed in the heating coil container space is smaller in thickness than the magnetic field shielding magnetic material disposed in the container portion.

8. The induction heating cooker according to claim 7, wherein
the magnetic field shielding magnetic material disposed in the heating coil container space and the magnetic field shielding magnetic material disposed in the container portion are substantially identical in volume to each other.

9. The induction heating cooker according to claim 7, wherein
the magnetic field shielding magnetic material disposed in the heating coil container space is greater in quantity than the magnetic field shielding magnetic material disposed in the container portion.

10. The induction heating cooker according to claim 7, wherein
the magnetic field shielding magnetic material disposed in the heating coil container space is longer in lateral width than the magnetic field shielding magnetic material disposed in the container portion.

11. The induction heating cooker according to claim 7, wherein
the magnetic field shielding magnetic material disposed in the heating coil container space and the magnetic field shielding magnetic material disposed in the container portion are disposed such that respective top surfaces of each are substantially level with each other.

12. The induction heating cooker according to claim 7, further comprising
a metal plate being a non-magnetic material having heat conductivity disposed between the flange and the one portion of the heating coil, wherein the magnetic field shielding magnetic material disposed in the heating coil container space is disposed on the metal plate.

13. A kitchen unit, comprising:
a cabinet;
an outer casing that is inserted into the cabinet;
a plate for covering a top portion of the outer casing;
a heating coil for inductively heating a heating-target object placed on the plate; and
an inverter device for supplying the heating coil with a high frequency current, wherein the outer casing has:
a container receptacle that forms a container portion containing the inverter device, and that is inserted into an opening formed at a top board of the cabinet; and
a flange that is formed to extend in an outward direction from a top portion of the container receptacle, and that is placed on the top board surrounding the opening, and wherein
a heating coil container space for containing one portion of the heating coil is formed above the top board between the flange and the plate, and the one portion of the heating coil is disposed in the heating coil container space.

* * * * *